(12) United States Patent
Ando

(10) Patent No.: US 7,800,794 B2
(45) Date of Patent: Sep. 21, 2010

(54) ORIGINAL TRANSPORTING DEVICE AND IMAGE READING APPARATUS

(75) Inventor: Motonobu Ando, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 894 days.

(21) Appl. No.: 11/531,785

(22) Filed: Sep. 14, 2006

(65) Prior Publication Data

US 2007/0070452 A1 Mar. 29, 2007

(30) Foreign Application Priority Data

Sep. 15, 2005 (JP) ............................. 2005-267997

(51) Int. Cl.
*G03G 15/00* (2006.01)
*H04N 1/04* (2006.01)

(52) U.S. Cl. ...................... 358/474; 358/496; 399/364; 399/373

(58) Field of Classification Search ................. 358/496, 358/497, 498; 271/3.05, 3.09, 3.14, 8.1, 271/9.02, 291; 355/23, 24, 25, 48; 399/361, 399/363, 364, 373, 368

See application file for complete search history.

(56) References Cited

U.S. PATENT DOCUMENTS

| | | | |
|---|---|---|---|
| 5,991,592 A | 11/1999 | Kobayashi et al. | |
| 6,038,424 A * | 3/2000 | Nakagawa | ................... 399/367 |
| 6,522,860 B2 * | 2/2003 | Nose et al. | ................... 399/374 |
| 6,785,485 B2 * | 8/2004 | Kamimura | ................... 399/71 |
| 2005/0082747 A1 * | 4/2005 | Tamura et al. | .............. 271/184 |
| 2006/0071393 A1 * | 4/2006 | Mizubata et al. | ......... 271/10.01 |

FOREIGN PATENT DOCUMENTS

| | | |
|---|---|---|
| JP | H887141 | 4/1996 |
| JP | H11157756 | 6/1999 |
| JP | 2001312106 | 11/2001 |
| JP | 200262693 | 2/2002 |
| JP | 200515122 | 1/2005 |

* cited by examiner

*Primary Examiner*—Jerome Grant, II
(74) *Attorney, Agent, or Firm*—Baker Botts L.L.P.

(57) ABSTRACT

An original transporting device includes: an original placing portion; an original discharging portion; a first transport path that connects the original placing portion and the original discharging portion; a second transport path that is branched from the first transport path and is connected to a switchback transport path; a changeover unit that changes over a transport route along which an original is transported to either one of the first transport path and the second transport path; a first detecting unit that detects the presence or absence of the original; a first determining unit that determines whether or not the original is a final page original based on the detection; and a controlling unit that controls a transporting unit and the changeover unit so as to discharge at least a portion of the final page original to outside the device through the second transport path based on the determination.

7 Claims, 29 Drawing Sheets

ORIGINAL TRANSPORTING DEVICE AND
IMAGE READING APPARATUS

CROSS-REFERENCE TO RELATED
APPLICATION(S)

This application is based upon and claims priority from prior Japanese Patent Application No. 2005-267997 filed on Sep. 15, 2005, the entire contents of which are incorporated herein by reference.

TECHNICAL FIELD

The present invention relates to an original transporting device for transporting an original placed on an original placing portion to an original discharging portion through a transport path connecting the original placing portion and the original discharging portion provided on its downstream side. More particularly, the present invention concerns an original transporting device in which an opening portion continuing to a switchback transport path is provided on an upper side of the original placing portion, and which transports the original in a switchback fashion in the transporting process of the original, as well as an image reading apparatus having the same.

BACKGROUND

Among image processing apparatuses such as a scanner (an image reading apparatus), a copying machine, a facsimile machine, and a combination machine (a multifunction device) having these various functions, an apparatus is widely known which has an original transporting device called an auto document feeder (ADF) for picking out one sheet at a time of a plurality of originals set on a paper feed tray (an original placing portion), feeding the original into a transport path, and automatically transporting the original onto a paper discharge tray via a reading position. Among such original transporting devices, one disclosed in JP-A-2001-312106 is provided with a so-called switchback transporting mechanism for inverting obverse and reverse surfaces of the original with respect to the reading position when, for example, a double-sided original is read.

Incidentally, the above-described original transporting device is in many cases installed below a user's line of sight. For this reason, in the original transporting device in which the paper discharge tray is disposed on the lower side of the paper feed tray, the original discharged onto the paper discharge tray is concealed by the paper feed tray. The user's attention tends to be directed toward a reproduced material on which image data which has been read or a copy image has been formed, rather than toward the discharged original. Hence, situations have conventionally occurred in which the user forgets the presence of the original and forgets to take out the original on the paper discharge tray.

As techniques for preventing the above-described forgetting to take out the original, various techniques have been proposed. For example, JP-A-8-87141 discloses a technique whereby an original receiver on which the discharged originals are placed is provided with an original discharge sensor, and after the lapse of a predetermined time upon detection by the discharge sensor of the original discharged onto the original receiver, a speaker provided on an apparatus body issues a sound. In addition, JP-A-2001-312106 discloses a technique whereby when a predetermined time has similarly elapsed, a message is given on a display panel to the effect that the original has not yet been taken out. Thus, attempts have been made to prevent forgetting to take out the original by arousing attention aurally in the former technique and visually in the latter technique.

In addition, JP-A-2002-62693 discloses an auto document feeder which is provided with a mechanism for moving the paper discharge tray disposed on the lower side of the paper feed tray to the rear end side of the paper discharge tray. Furthermore, JP-A-2005-15122 discloses an automatic original transporting device which is provided with a mechanism for raising the paper feed tray upward after completion of the original reading operation. These devices facilitate the prevention of forgetting to take out the original.

SUMMARY

Aspects of the invention provides an original transporting device with a switchback transporting mechanism which makes it possible to suitably arouse the user's attention to the prevention of forgetting to take out the original by directly allowing the user to visually recognize the discharged original without entailing the complexity of the device and the enlargement of the scale of the device.

In other aspects, the invention provides an image reading apparatus having this original transporting device.

BRIEF DESCRIPTION OF THE DRAWINGS

These and other objects and advantages of the present invention will be more fully apparent from the following detailed description taken in conjunction with the accompanying drawings, in which.

DETAILED DESCRIPTION OF THE ILLUSTRATIVE ASPECTS

Figure 1:
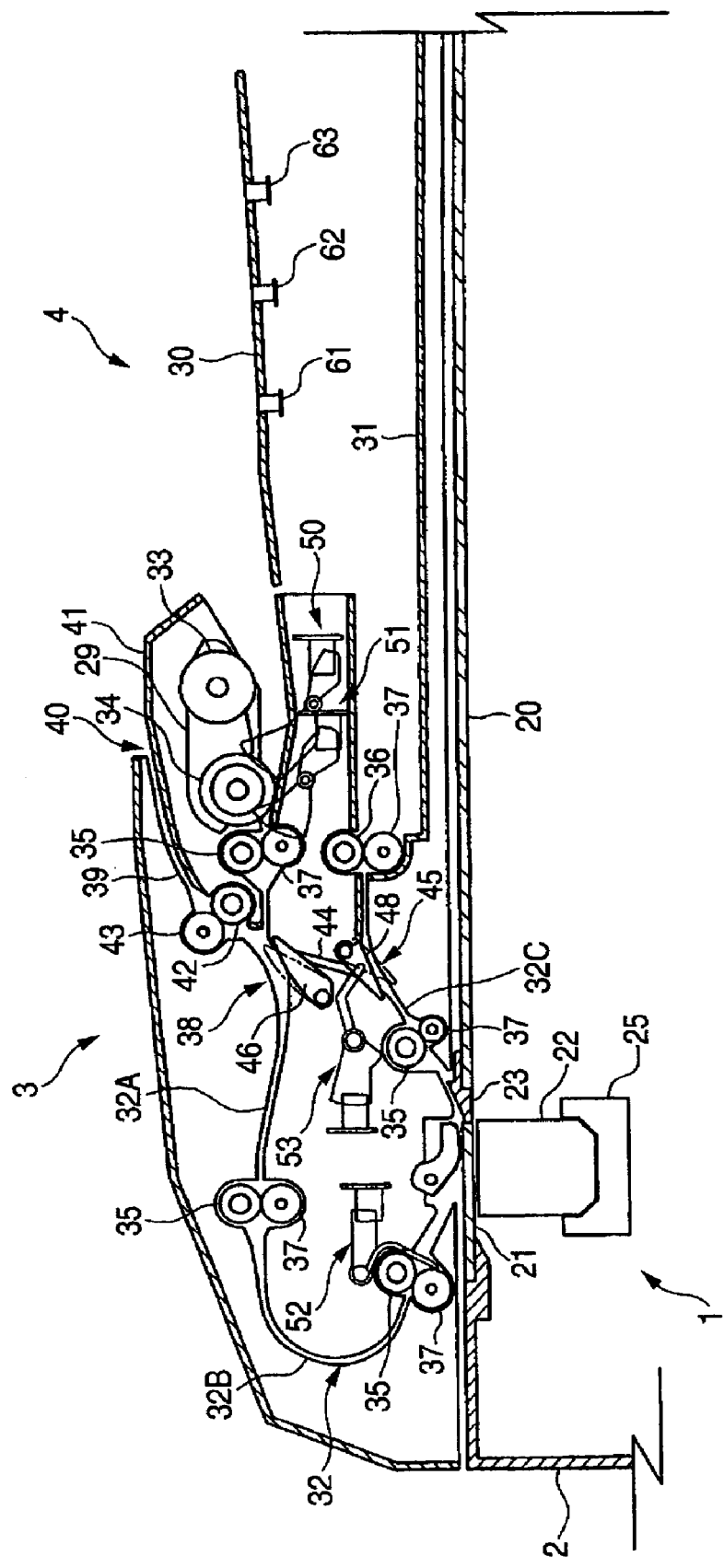
FIG. 1 is a vertical cross-sectional view illustrating the principal configuration of an image reading apparatus 1.

Referring now to the drawings, as required, a description will be given of an aspect of the invention. It should be noted that this aspect is merely an example of the invention, and it goes without saying that the aspect can be modified appropriately within the scope which does not change the gist of the invention.

General Overview

According to an aspect of the invention, there is provided an original transporting device including: an original placing portion on which an original is placed; an original discharging portion that is provided on a lower side of the original placing portion and on which the original is discharged; a first transport path that connects the original placing portion and the original discharging portion via a reading position; an opening portion provided on an upper side of the original placing portion to expose the original to outside the device; a switchback transport path formed continuously with the opening portion; a second transport path that is branched off from a downstream side of the reading position of the first transport path and is connected to the switchback transport path; a transporting unit provided at least on the first transport path and the switchback transport path to transport the original; a changeover unit that is disposed at a branching position between the first transport path and the second transport path, the changeover unit is capable of changing a transport route along which the original is transported to a route by way of the first transport path and is, capable of changing the transport route to a route by way of the second transport path; a first detecting unit that detects the presence or absence of the original placed on the original placing portion; a first determining unit that determines whether or not the original, which is fed from the original placing portion into the first transport path, is a final page original based on a result of detection by the first detecting unit; and a controlling unit that controls the transporting unit and the changeover unit so as to discharge at least a portion of the final page original whose image has been read at the reading position to outside the device from the opening portion of the switchback transport path through the second transport path on condition that the original, which is fed to the first transport path, is determined by the first determining unit to be the final page original.

In this original transporting device, an original discharging portion is provided on the lower side of the original placing portion, and an opening portion is provided on the upper side of the original placing portion. The original placing portion and the original discharging portion are connected by the first transport path. The switchback transport path is provided so as to continue to the opening portion, and the second transport path which is branched from the downstream side of the reading position of the first transport path is connected to the switchback transport path. It should be noted that the aforementioned opening portion is provided at a final end of the switchback transport path.

In the case where the switchback transport is not required as in the case of single-sided reading, the transport route of the original is changed over to the route by way of the first transport path. The originals excluding a final page original and placed on the original placing portion are fed one by one into the first transport path, and each of these originals is transported to the first transport path by the transporting unit, passes the branching position and the reading position, and is discharged onto the original discharging portion.

Here, if it is determined that the original fed from the original placing portion into the first transport path is a final page original, the changeover unit is controlled, and the transport route of the original which passed the reading position is changed over to the route by way of the second transport path and the switchback transport path. The final page original which was fed from the original placing portion into the first transport path and is transported to the branching position on the downstream side of the reading position by the transporting unit is guided so as to enter the second transport path. When the final page original enters the second transport path, that original is transported to the switchback transport path, and is discharged so as to be exposed from the opening portion to outside the device.

On the other hand, in a case where switchback transport is required as in the case of double-sided reading, as the changeover unit is controlled, the transport route of the original is changed over at the branching position so that the original enters the second transport path from the first transport path. The originals excluding a final page original and placed on the original placing portion ate fed one by one into the first transport path, and each of these originals is transported to the branching position on the downstream side of the reading position through the first transport path by the transporting unit. Then, at that branching position, the original whose first surface has been read is guided from the first transport path to the second transport path. As a result, the original is made to enter the second transport path.

When the original enters the second transport path, that original is retreated to the switchback path and is returned. Namely, the original is transported in a switchback fashion. As a result, the leading and trailing ends of the original are inverted. Subsequently, the original is converted to the upstream side of the first transport path by the transporting unit. Then, the original is transported along the first transport path by the transporting unit, and is led to the reading position. The original is then transported in a state in which the second surface of the original is opposed to the reading position.

Subsequently, the original whose second surface has passed the reading position is guided in the same way as described above so as to enter the second transport path from the first transport path again through the route by way of the second transport path to which the route has been changed over by the changeover unit. As a result, the original enters the second transport path again. Then, the original which entered the second transport path is retreated again to the switchback path, is returned to the first transport path with its leading and trailing ends inverted again, and is transported along the first transport path with its first surface opposing the reading position. At this time, at the branching position on the downstream side of the reading position of the first transport path, as the changeover unit is controlled by the controlling unit, the transport route of the original is changed over to the route by way of the first transport path. As a result, the original is guided to the original discharge portion without being guided to the second transport path, and is discharged onto the original discharging portion.

Here, if it is determined that the original which is fed from the original placing portion into the first transport path is a final page original, the original is transported through the same route as mentioned above, the first and second surfaces are read at the reading position. Subsequently, the original is returned to the first transport path with its leading and trailing ends inverted again, and is transported along the first transport path with its first surface opposing the reading position. At this time, the changeover unit is controlled by the controlling unit, and the transport route of the original is changed over to the route by way of the second transport path. Accordingly, the final page original which passed the reading position is guided to the second transport path, and enters the second transport path.

When the original enters the second transport path, that original is retreated to the switchback transport path by the transporting unit which is controlled by the controlling unit. However, the original is discharged so as to be exposed to outside the device from the opening located at its final end without being transported in the switchback fashion.

It should be noted that in a case where there is no need to match the stacking order of the originals placed on the original placing portion and the stacking order of the originals discharged onto the original discharging portion, after the original is transported with its second surface opposing the reading position, the original may be discharged onto the original discharging portion without causing the original to enter the second transport path again. It goes without saying that the final page original in this case is discharged to outside the device from the opening portion.

As a result, it is possible to allow the user to directly recognize the originals visually and to be strongly impressed visually with the presence of the originals, thereby suitably arousing the user's attention to the prevention of forgetting to take out the originals discharged onto the original discharging portion. In consequence, cases of forgetting to take out the originals are reduced.

According to another aspect of the invention, there is provided an image reading apparatus including: an original placing portion on which an original is placed; an original discharging portion that is provided on a lower side of the original placing portion and on which the original is discharged; a first transport path that connects the original placing portion and the original discharging portion via a reading position; an opening portion provided on an upper side of the original placing portion to expose the original to outside the device; a switchback transport path formed continuously with the opening portion; a second transport path that is branched off from a downstream side of the reading position of the first transport path and is connected to the switchback transport path; a transporting unit provided at least on the first transport path and the switchback transport path to transport the original; a changeover unit that is disposed at a branching position between the first transport path and the second transport path, the changeover unit is capable of changing a transport route along which the original is transported to a route by way of the first transport path and is capable of changing the transport route to a route by way of the second transport path; a first detecting unit that detects the presence or absence of the original placed on the original placing portion; a first determining unit that determines whether or not the original, which is fed from the original placing portion into the first transport path, is a final page original based on a result of detection by the first detecting unit; a controlling unit that controls the transporting unit and the changeover unit so as to discharge at least a portion of the final page original whose image has been read at the reading position to outside the device from the opening portion of the switchback transport path through the second transport path on condition that the original, which is fed to the first transport path, is determined by the first determining unit to be the final page original; and an image reading unit that reads an image on the original, which passes the reading position.

FIG. 1 is a vertical cross-sectional view illustrating the principal configuration of an image reading apparatus 1 in accordance with an aspect of the invention. This image reading apparatus 1 is realized as an image reading section for performing the reading of an image on an original in, for example, a copying machine, a facsimile machine, a scanner, a multi-function device (MFD) integrally having these functions, and so on.

As shown in FIG. 1, in the image reading apparatus 1, a document cover 4 having an auto document feeder (ADF) 3, which is an automatic document transporting mechanism, is openably attached to an original placing table 2, which functions as a flatbed scanner (FBS), by means of hinges on the rear surface side (a rear side of the paper). This ADF 3 constitutes the original transporting device in accordance with the invention.

On the original placing table 2, platen glass 20 and 21 is disposed on its top surface opposing the original cover 4. As the original cover 4 is opened, the platen glass 20 and 21 is exposed as an upper surface of the original placing table 2. In addition, as the original cover 4 is closed, the overall upper surface of the original placing table 2 including the platen glass 20 and 21 is covered. An image reading unit 22 and a carriage 25 for supporting and transporting the image reading unit 22 are incorporated inside the original placing table 2 in such a manner as to oppose the platen glass 20 and 21.

The platen glass 20 is one on which an original is placed in the case where the image reading apparatus 1 is used as the FBS and is formed of a transparent glass plate, for example. An opening for exposing the platen glass 20 is formed in the center of the upper surface of the original placing table 2, and the area of the platen glass 20 exposed through the opening serves as an original reading area in the FBS.

The platen glass 21 constitutes a reading position in the case where the ADF 3 of the image reading apparatus 1 is used and is formed of a transparent glass plate, for example. The platen glass 21 extends in the depthwise direction of FIG. 1 in correspondence with the length in the main scanning direction of the image reading unit 22.

A positioning member 23 is interposed between the platen glass 20 and the platen glass 21. The positioning member 23 is an elongated flat plate-shaped member extending in the depthwise direction in FIG. 1 in the same way as the platen glass 21. The positioning member 23 is used as a reference for positioning the original when the original is placed on the platen glass 20 which is the original placing surface in the FBS. For this reason, indications indicating a central position and both end positions of various original sizes such as the A4 size, B5 size, and the like are inscribed on the upper surface of the positioning member 23. In addition, a guide surface for scooping up the original passing over the platen glass 21 by the ADF 3 and for returning it to the ADF 3 is formed on the upper surface of the positioning member 23.

The image reading unit 22 includes a close contact-type CIS (contact image sensor) image sensor 24 (see FIG. 7) which integrally has a light source, a lens for focusing the reflected light from the original after the original is irradiated with light from the light source through the platen glass 20 and 21, and a light receiving element such as a linear photo sensor for receiving the light focused by the lens and converting it into an electrical signal. It should be noted that, as the image reading unit 22, it is possible to use, instead of the CIS image sensor 24, a CCD (charge coupled device) image sensor of a reduction optical system, or a CMOS (complementary metal-oxide semiconductor) image sensor. In addition, the carriage 25 is coupled to a belt drive mechanism which is a scanning mechanism and supports the image reading unit 22 below the platen glass 20 and 21 so as to be capable of scanning. As the carriage 25 reciprocatingly moves in the left-and-right direction in FIG. 1 in parallel with the platen glass 20 and 21 by receiving the driving force from a carriage motor 112 (see FIG. 7), the image reading unit 22 is similarly reciprocatingly moved.

As shown in FIG. 1, a paper feed tray 30 (an original placing portion), on which the original is placed, and a paper discharge tray 31 (an original discharging portion), onto which the original is discharged, are provided on the upper surface of the original cover 4. The paper feed tray 30 and the paper discharge tray 31 are connected by a transport path 32 (a first transport path). The ADF 3 provided on the original cover 4 is for automatically and continuously transporting the original from the paper feed tray 30 to the paper discharge tray 31 via the transport path 32. In the process of the transport of the original by the ADF 3, the original passes over the platen glass 21, and in the meantime the image reading unit 22 which is on standby below the platen glass 21 is adapted to read the image on the original.

The paper feed tray 30 and the paper discharge tray 31 are provided in two stages, that is upper and lower stages, on the upper side of the original cover 4. Specifically, the paper discharge tray 31 is provided on the lower side of the paper feed tray 30. The original to be subjected to image reading by the ADF 3 is placed on the paper feed tray 30, and a plurality of originals are placed on the paper feed tray 30 in a stacked state in which the first page is placed at the top and such that leading ends in the paper feeding direction are inserted into the transport path 32.

The paper discharge tray 31 is disposed on the lower side of the paper feed tray 30 at a vertically spaced-apart position, and is formed integrally on the upper surface of the original cover 4. Accordingly, the originals discharged from the ADF 3 are held on the paper discharge tray 31 in such a manner as to be stacked with the first page placed at the bottom. They are separated from the originals on the paper feed tray 30.

As shown in FIG. 1, a plurality of sensors are provided on the paper feed tray 30 for detecting the size of the originals placed on the paper feed tray 30. More specifically, a first size sensor 61, a second size sensor 62, and a third size sensor are sequentially disposed, as viewed from a feed-in roller 33 side, along the left-and-right direction in FIG. 1 of the paper feed tray 30. These size sensors are photointerrupters of the reflection type in which a light emitting portion and a light receiving type are integrated, and in which light is emitted from the light emitting portion, and the presence or absence of an object to be detected is detected on the basis of whether or not the reflected light reflected from the object to be detected is received by the light receiving portion. Accordingly, if the size sensor is covered by the original, the reflected light from the original is transmitted to the light receiving portion, and an "on" signal is outputted from the size sensor. If the size sensor is exposed without being covered by the original, the light is not transmitted to the light receiving portion, and an "off" signal is outputted from the size sensor.

Figure 2A:
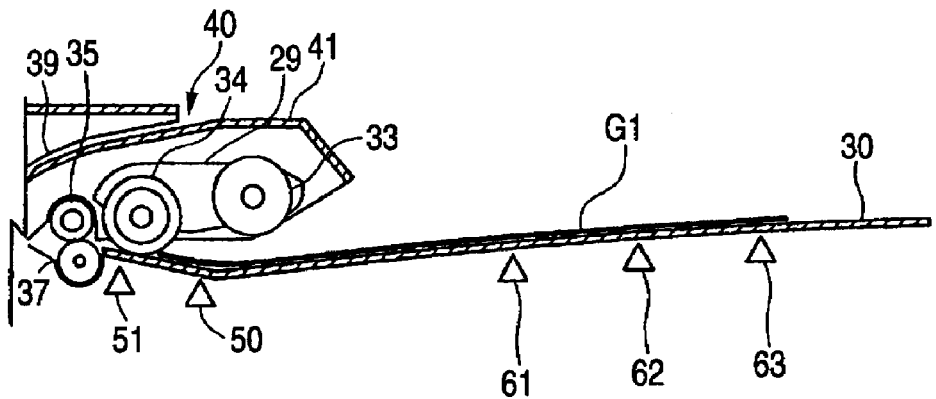
FIGS. 2A to 2C are schematic diagrams explaining a method of detecting the size of an original.
Figure 2B:
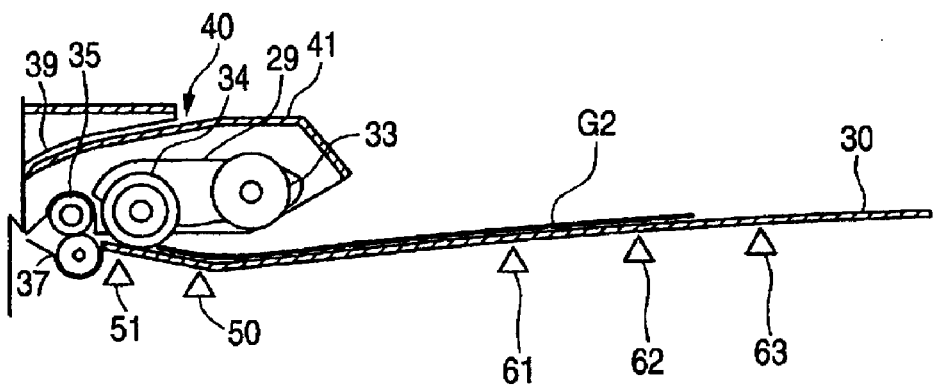
Figure 2C:
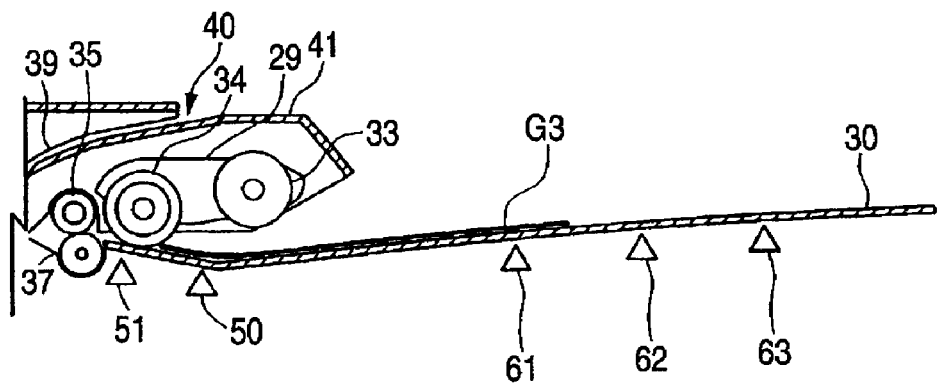

The respective size sensors are disposed at such positions that all the sensors are covered when originals G1 of the A4 size or larger are placed on the paper feed tray 30, as shown in FIG. 2A, and the third size sensor 63 is exposed and the first size sensor 61 and the second size sensor 62 are covered when originals G2 of the B5 size are placed, as shown in FIG. 2B. In addition, the size sensors are disposed at such positions that only the first size sensor 61 is covered when originals G3 of the A5 size are placed, as shown in FIG. 2C, and all the size sensors are exposed when originals smaller than the A5 size are placed. It should be noted that the first size sensor 61, the second size sensor 62, and the third size sensor 63 correspond to the second detecting unit in accordance with the invention.

As shown in FIG. 1, a transverse, substantially U-shaped transport path 32 in a vertical cross-sectional view is formed inside the ADF 3 in such a manner as to connect the paper feed tray 30 and the paper discharge tray 31. This transport path 32 is continuously formed as a path of a predetermined width allowing the passage of the originals therealong by members and guide plates which constitute the main body of the ADF. More specifically, the transport path 32 has a shape that extends from the paper feed tray 30 to one end side (a left-hand side in the drawing) of the original cover 4, is subsequently curved downward in such a manner as to be inverted to reach a reading position on the platen glass 21, and extends from the reading position toward the paper discharge tray 31. The transport path 32, generally consists of three portions including an upper portion 32A and a lower portion 32C constituting upper and lower two-stage rectilinear portions in the U shape, and a curved portion 32B which is curved so as to connect the upper portion 32A and the lower portion 32C. This transport path 32 is used as a transport route for originals in common to the single-sided reading and double-sided reading of originals by the ADF 3.

A transporting unit for transporting the originals is disposed on the above-described transport path 32. More specifically, as shown in the drawing, the transporting unit is constituted by the feed-in roller 33, a separation roller 34, transport rollers 35, and a discharge roller 36 which are respectively provided on the transport path 32, as well as pinch rollers 37 which are in pressure contact with these rollers. It should be noted that this constitution of the respective rollers and the like constituting the transporting unit is only one example. It goes without saying that changes may be made in the number of rollers and the arrangement thereof, and this transporting unit may be changed to another known transporting means.

As shown in the drawing, the feed-in roller 33 and the separation roller 34 are provided in the vicinity of the upstreammost side of the transport path 32. The feed-in roller 33 is rotatably provided at a distal end portion of an arm 29 provided coaxially with a rotating shaft of the separation roller 34. In addition, the separation roller 34 is provided rotatably at a position spaced apart front the feed-in roller 33 in the paper feeding direction in such a manner as to abut against an opposing surface of the transport path 32. The feed-in roller 33 and the separation roller 34 are adapted to be rotatively driven as the driving force from an original transporting motor 113 (see FIG. 7) is transmitted thereto, and the arm 29 is also adapted to be swung as the driving force from the original transporting motor 113 (see FIG. 7) is transmitted thereto. Further, the feed-in roller 33 and the separation roller 34 have the same diameters, and are rotated at the same peripheral speed. In addition, a separation pad for separating the original by friction by coming into pressure contact with the roller surface of the separation roller 34 is disposed at a position opposing the separation roller 34.

The transport rollers 35 are disposed at predetermined positions on the transport path 32. More specifically, the transport rollers 35 are disposed at four positions including an immediately downstream side of the separation roller 34, the upper portion 32A of the transport path 32, an immediately upstream side of the lower position 32C, and an immediately downstream side of the reading position at the lower portion 32C. These transport rollers 35 are adapted to be rotatively driven as the driving force from the original transporting motor 113 (see FIG. 7) is transmitted thereto. The above-described arrangement of the transport rollers 35 is only one example. It goes without saying that the arrangement of the transport rollers 35 can be changed, as required.

In addition, the pinch rollers 37 are each provided at a position opposing the respective transport roller 35. Each pinch roller 37 is brought into pressure contact with the roller surface of each transport roller 35. When the transport roller 35 is rotated, the pinch roller 37 is also rotated by being driven by the transport roller 36. By means of these pinch rollers 37, the original is brought into pressure contact with the transport roller 35, and the torque of the transport roller 35 is transmitted to the original.

The discharge roller 36 is disposed in the vicinity of the downstreammost side of the transport path 32 and is adapted to be rotatively driven as the driving force from the original transporting motor 113 is transmitted thereto in the same way as the transport rollers 35. Also, the pinch roller 37 is provided at a position opposing the discharge roller 36, and the pinch roller 37 is brought into pressure contact with the discharge roller 36 by being resiliently urged by a spring.

A switchback path 39 (a switchback transport path) is connected to the upper portion 32A of the transport path 32. The switchback path 39 is formed in such a manner as to branch diagonally upward from a converging position 38 (a second branching position) of the upper portion 32A of the transport path 32 toward the upper side of the paper feed tray 30. The switchback path 39 is essentially used, at the time of performing double-sided reading, to change the leading end and the trailing end of the original whose first page has been read at the reading position and to resend the original to the upper portion 32A of the transport path 32. In this aspect, however, the switchback path 39 is also used as a transport path for discharging to outside the apparatus a final page original which has been fed from the paper feed tray 30 and for which image reading has been completed, or an original having a size sufficiently smaller than a maximum readable size, such as an A5 or a postcard size original. It should be noted that the space on the upper side of the paper feed tray 30 can be effectively utilized by forming the switchback path 39 diagonally upward from the upper portion 32A of the transport path 32 toward the upper side of the paper feed tray 30. In addition, the transport route extending from the paper feed tray 30 side of the transport path 32 to the reading position side thereof and the transport route extending from and including the switchback path 39 to the reading position side of the transport path 32 meet at an acute angle at the converging position 38. Therefore, at the converging position 38, the original does not enter the switchback path 39 from the paper feed tray 30 side of the transport path 32, and the original returned from the switchback path 39 does not enter the paper feed tray 30 side of the transport path 32. This facilitates the constitution of a below-described guide flap 46 (a guide member) for transporting the original to a predetermined transport route at the converging position 38.

A final end 40 of the switchback path 39 is open in the upper surface of the ADF 3. The final end 40 is disposed upwardly of the paper feed tray 30 and is provided so as to continue to outside the apparatus at the upper surface of the ADF 3. This final end 40 corresponds to an opening portion in the invention. The distance of the transport route constituted by the switchback path 39 is set to be shorter than the length in the transporting direction of the original of at least a double-side readable maximum size, such that a part of the original entering the switchback path 39 is exposed to the outside of the ADF 3 beyond the final end 40. Accordingly, it is unnecessary to secure the distance of the transport route of the switchback path 39 by more than the length in the transporting direction of the largest readable original.

An original supporting portion 41 is formed from the final end 40 to the paper feed tray 30 side of the above-described switchback path 39 in such a manner as to continue from the final end 40. The original supporting portion 41 is for supporting the original exposed from the final end 40 of the switchback path 39 and constitutes the housing of the ADF 3 on the upper side of the feed-in roller 33 and the separation roller 34. The housing of the ADF 3 is formed in such a manner as to cover the feed-in roller 33 and the separation roller 34, and the original supporting portion 41 formed as the housing extends from the aforementioned final end 40 toward the paper feed tray 30 side up to the upstream side of the position of paper feeding by the feed-in roller 33 and the separation roller 34. As a result, in the double-sided reading, the original exposed to outside the ADF 3 from the final end 40 after entering the switchback path 39 is prevented from drooping down onto the paper feed tray 30 owing to its own weight and from being fed again by the feed-in roller 33.

Figure 3:
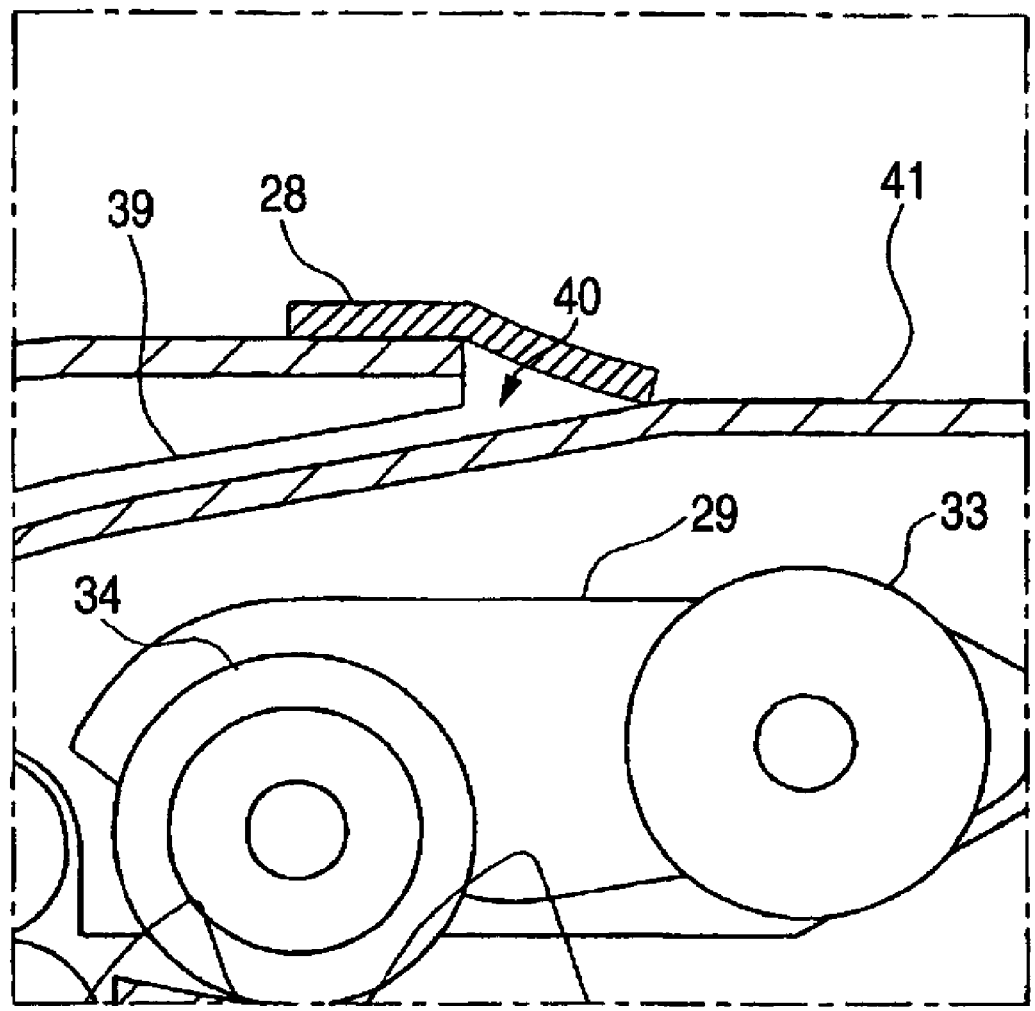
FIG. 3 is a enlarged partial view illustrating the structure of an original presser 28.

In addition, as shown in FIG. 3, an original presser 28 (an original holding member) extending from the final end 40 toward the paper feed tray 30 side is provided at the final end 40 of the above-described switchback path 39. The original presser 28 consists of a flexible thin plate member, and is formed substantially in a chevron shape in a vertical sectional view as it is bent at the vicinity of its center at an obtuse angle. The original presser 28 is provided substantially in the depth-wise center at the final end 40. One end of the original presser 28 is fixed to an upper portion of the housing of the ADF 3 for forming an opening of the final end 40, while the other end thereof extends in such a manner as to be gently inclined diagonally downward toward the original supporting portion 41 and abuts against the original supporting portion 41 in an urging manner. The original presser 28 is brought into pressure contact with the original supporting portion 41 with such an urging force that the leading end of the original is able to push up the original presser 28 by the transporting force of the original which entered the switchback path 39, and yet when the original has completely entered the switchback path 39 and is exposed from the opening, the original presser 28 is able to hold in a nipping manner the original which is liable to drop toward the paper feed tray 30 side by its own weight.

In addition, a switchback roller 42 (an example of the transporting unit) is disposed in the above-described switchback path 39. The switchback roller 42 is adapted to be rotatively driven in both the forward and backward direction as the driving force from the original transporting motor 113 (see FIG. 7) is transmitted thereto. In addition, a pinch roller 43 is provided at a position opposing the switchback roller 42. The pinch roller 43 is brought into pressure contact with the roller surface of the switchback roller 42 as its shaft is resiliently urged by a spring, and the pinch roller 43 rotates by being driven by the rotation of the switchback roller 42. The original is brought into pressure contact with the switchback roller 42 by this pinch roller 43, and the torque of the switchback roller 42 is transmitted to the original. The switchback transport of the original is provided by the switchback roller 42 and the pinch roller 43.

A bypath 44 (a second transport path) for leading the original into the switchback path 39 is formed in the lower portion 32C of the transport path 32 downstream of the reading position. More specifically, the bypath 44 is formed so as to branch off from a branching position 45 (a first branching position) in the lower portion 32C of the transport path 32 on the downstream side of the reading position and so as to be oriented diagonally upward toward right to be connected to the upper portion 32A of the transport path 32 at the aforementioned converging position 38. Accordingly, the bypath 44 is connected to the entrance port of the switchback path 39. Thus, the constitution of the vicinity of the curved portion 32B of the transport path 32 can be simplified as the converging position 38 for branching from the transverse substantially U-shaped transport path 32 to the switchback path 39 is disposed in the upper portion 32A of the transport path 32, and the branching position 45 for branching from the downstream side of the reading position to the bypath 44 for connecting to the switchback path 39 is disposed in the lower portion 32C. It should be noted that the bypath 44 is essentially used at the time of performing double-sided reading to lead to the switchback path 39 the original whose first page has been read at the reading position. In this aspect, however, the bypath 44 is also used for leading to the switchback path 39 a final page original for which image reading has been completed or a small-size original, so as to discharge these originals from the final end 40 to outside the apparatus.

In addition, in contrast to the fact that the transport route from the bypath 44 to the switchback path 39 is substantially rectilinear, the transport route from the bypath 44 to the paper feed tray 30 side of the transport path 32 is bent. For this reason, the original which has been transported from the bypath 39 to the converging position 38 advances straight to the switchback path 39 without advancing to the paper feed tray 30 side of the transport path 32. Accordingly, the constitution of the guide flap 46 at the converging position 38 is facilitated.

The transport route, which is formed in such a manner as to extend from the reading position of the above-described transport path 32 to and including the switchback path 39 via the bypath 44, is formed in an S-shape in a vertical sectional view. As a result, the transport of the original from the reading position of the transport path 32 to and including the switchback path 39 via the bypath 44 becomes smooth, and paper jamming at the converging position 38 and the branching position 45 is prevented. In addition, the transport route which is formed in such a manner as to extend from and including the rectilinear upper portion 32A of the above-described U-shaped transport path 32 to and including the switchback path 39 via the converging position 38 is also formed in an S-shape in a vertical sectional view. As a result, the transport of the original from and including the switchback path 39 to and including the upper portion 32A of the transport path 32 via the converging position 38 becomes smooth, and paper jamming at such as the converging position 38 is prevented. In addition, as the two transport routs are formed in the S-shape, as described above, the constitution of the guide flap 46 at the converging position 38 is facilitated.

In addition, the length of the loop-shaped transport route from the converging position 38 of the transport path 32 to the converging position 38 via the reading position and the branching position 45 is set to be longer than the length in the transporting direction of a largest readable original. If the largest readable original is the A4 size, the length in the transporting direction is 297 mm; if it is the letter size, the length is 11 inches; and if it is the legal size, the length is 14 inches, so that the length in the loop-shaped transport route is set to be longer than these sizes. As a result, in the double-sided reading, when the leading end of the original advances to the converging position 38 after passing the reading position, the trailing end of the original is bound to have passed the converging position 38. Therefore, it is possible to prevent the paper jamming and the like at the converging position 38.

Figure 4:
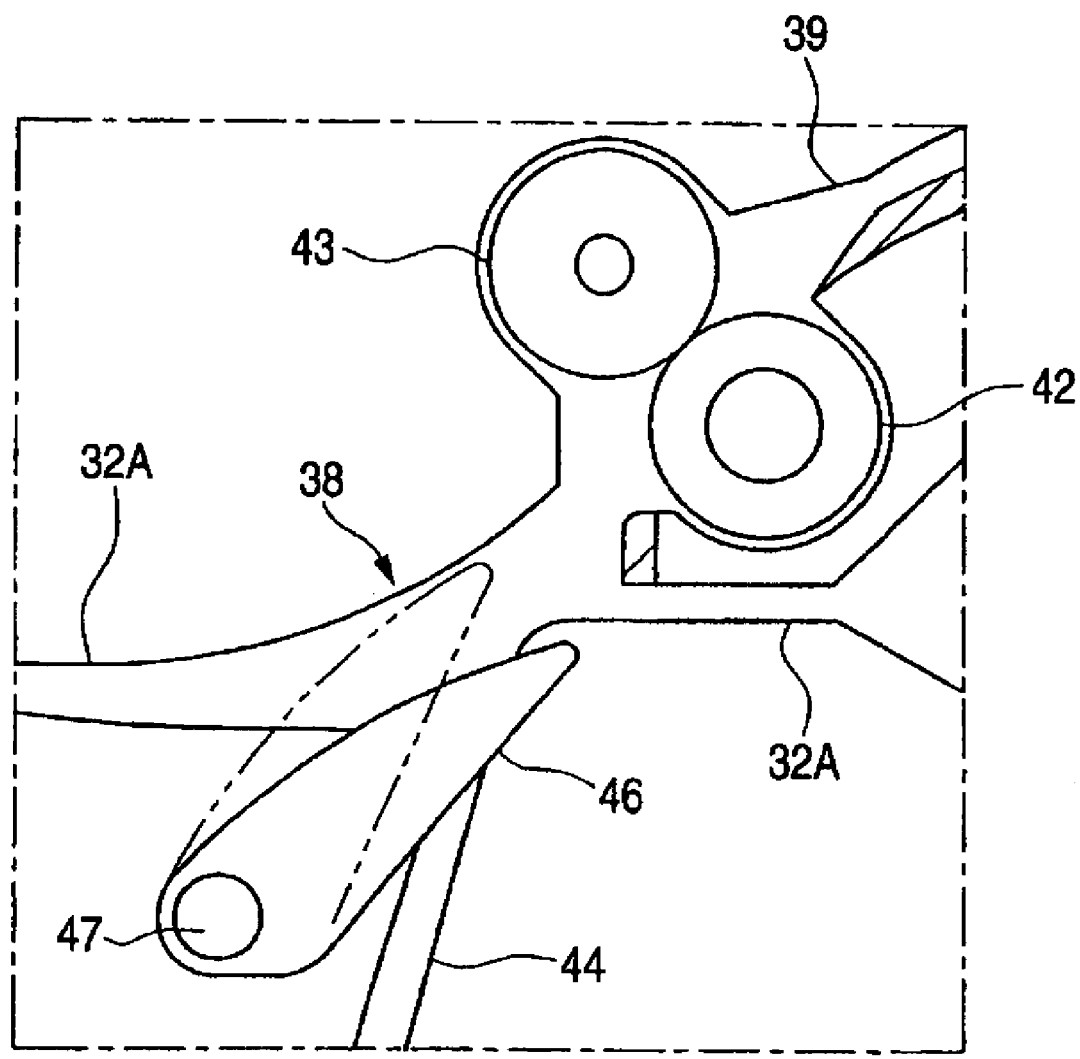
FIG. 4 is a enlarged partial view illustrating the structure of a converging position 38 and its vicinity.

Here, a description will be given of the aforementioned guide flap 46. As shown in FIGS. 1 and 4, the guide flap 46 (a guide member) for guiding the original to a desired transport route is disposed at the aforementioned converging position 38. The guide flap 46 is disposed swingably about a shaft 47 (see FIG. 4) and is adapted to be changed over between the position shown by the solid line in FIG. 4 and the position shown by the two-dot chain line. In the case where the guide flap 46 is at the position shown by the solid line, the transport route from the paper feed tray 30 side (a right side in the drawing) to the reading position side (a left side in the drawing) of the upper portion 32A of the transport path 32 becomes continuous. Accordingly, the original fed from the paper feed tray 30 is guided at the converging position 38 toward the reading position upstream side of the upper portion 32A of the transport path 32. Meanwhile, in the case where the guide flap 46 is at the position shown by the two-dot chain line, the transport route from the bypath 44 to the switchback path 39 becomes continuous. Accordingly, the original which is transported toward the upper side along the bypath 44 is guided at the converging position 38 so as to enter the switchback path 39.

The changeover of the transport route by the guide flap 46 is effected by abutment of the original. More specifically, as shown by the solid line in FIG. 4, the guide flap 46 is at such a position that the transport route from the paper teed tray 30 side (a right side in the drawing) to the reading position side (a left side in the drawing) of the transport path 32 is continuous. As the original which is transported toward the upper side along the bypath 44 abuts against the guide flap 46, the guide flap 46 is pushed upward and swings to the position shown by the two-dot chain line in FIG. 4, and the original advances into the switchback path 39 in such a way as to traverse the transport path 32. When the original has completely entered the switchback path 39, the abutment of the original against the guide flap 46 ceases, and the guide flap 46 returns to the position shown by the solid line in FIG. 4. In addition, when the switchback roller 42 is reversely driven, and the original is thereby transported from the switchback path 39 to the converging position 38, the original abuts against the guide flap 46. However, since the guide flap 46 does not swing downward from the position shown by the solid line in FIG. 4, the original is guided by the guide flap 46 and enters the reading position side (a left side in the drawing) along the upper portion 32A of the transport path 32. It should be noted that since the route from the switchback path 39 to the paper feed tray 30 side (a right side in the drawing) of the upper portion 32A is bent at an acute angle, the original transported from the switchback path 39 to the converging position 38 does not enter the paper feed tray 30 side. Thus, the guide flap 46 is disposed at the converging position 38 in such a manner as to be capable of guiding the original to a desired transport route. It should be noted that, although in this aspect the guide flap 46 is arranged to be changed over by the abutment of the original, the guide flap 46 may be actively swung by the driving force of the original transporting motor 113 (see FIG. 7) for driving the transport rollers and the like.

Figure 5:
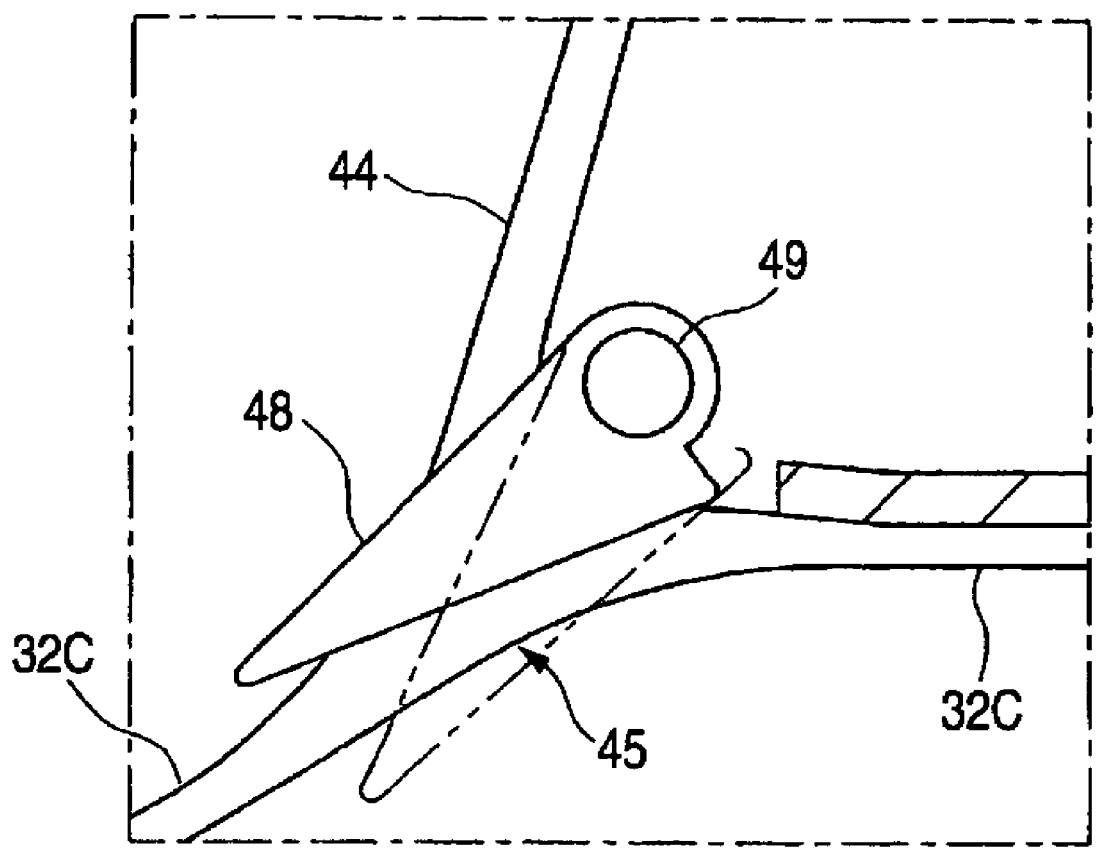
FIG. 5 is a enlarged partial view illustrating the structure of a branching position and its vicinity.

Next, referring to FIGS. 1 and 5, a description will be given of a guide flap 48 (a guide member) disposed at the branching position 45. The guide flap 48 is disposed swingably about a shaft 49 (see FIG. 5), and is adapted to be changed over between the position shown by the solid line in FIG. 5 and the position shown by the two-dot chain line. In the case where the guide flap 48 is at the position shown by the solid line, the transport route from the reading position side (a left side in the drawing) to the paper discharge tray 31 side (a right side in the drawing) of the transport path 32 becomes continuous. At this time, the original which has passed the reading position is guided at the branching position 45 along the lower portion 32C of the transport path 32 toward the paper discharge tray 31. Meanwhile, in the case where the guide flap 48 is at the position shown by the two-dot chain line, the transport route from the downstream side of the reading position of the lower portion 32C of the transport path 32 to the bypath 44 becomes continuous. At this time, the original which has passed the reading position is guided at the branching position 45 so as to enter the bypath 44.

The changeover of the transport route by the guide flap 48 is effected as the driving of a flap motor 111 (see FIG. 7), which is an example of the driving unit connected to the shaft 49 of the guide flap 48, is controlled. For example, when the flap motor 111 is controlled, and the torque is applied to the shaft 49 counterclockwise, the guide flap 48 is swung counterclockwise and moves to the position shown by the two-dot chain line in FIG. 5, i.e., the transport route of the original changes to the position where it continues from the downstream side of the reading position of the lower portion 32C of the transport path 32 to the bypath 44. Meanwhile, when the flap motor 111 is controlled, and the torque is applied to the shaft 49 clockwise, the guide flap 48 is swung clockwise and moves to the position shown by the solid line in FIG. 5, i.e., the transport route of the original changes to the position where it continues from the downstream side of the reading position of the lower portion 32C of the transport path 32 to the paper discharge tray 31 side. Thus, the guide flap 48 is disposed at the converging position 38 in such a manner as to be capable of guiding the original to a desired transport route. It should be noted that although in this aspect the guide flap 48 is arranged to be changed over as the flap motor 111 is controlled, a driving unit such as a solenoid may be used instead of the flap motor 111. In addition, the above-described operation may be carried out by coupling the shaft 49 of the guide flap 48 and the original transporting motor 113 (see FIG. 7) by means of a drive transmitting mechanism such as an electromagnetic clutch and by controlling that drive transmitting mechanism.

As shown in FIG. 1, the above-described transport path 32 and bypath 44 are provided with a plurality of sensors for detecting the transport of the original. More specifically, on the transport path 32, a first front sensor 50 and a second front sensor 51 are respectively provided on the upstream side and downstream side of the separation roller 34, and a rear sensor 52 is provided immediately upstream of the reading position. Furthermore, a switchback sensor 53 is provided on the bypath 4. These sensors are so-called optical sensors, and since they have similar structures except that shapes and the like of detectors differ depending on the detecting position, a description will be given of the structure by citing the first front sensor 50 as an example.

Figure 6:
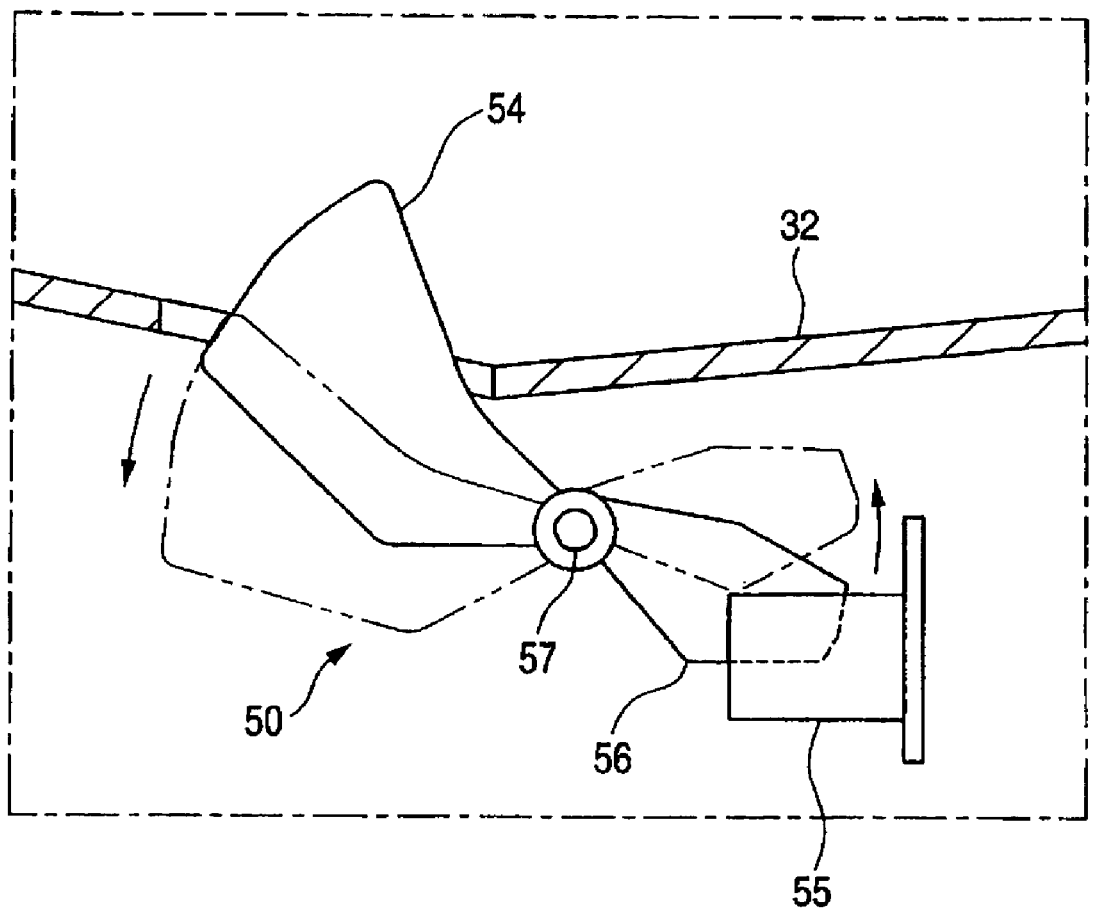
FIG. 6 is a enlarged partial view illustrating the structure of a first front sensor 50.

As shown in FIG. 6, the first front sensor 50 consists of a detector 54 which projects from the lower surface of the transport path 32 and rotates so as to retreat from the transport path 32 by coming into contact with the original, as well as a photointerrupter 55 for detecting the rotation of the detector 54. A shielding portion 56 which is detected by the photointerrupter 55 is formed integrally with the detector 54 and is provided rotatably about a shaft 57. The detector 54 is resiliently urged to the position where the detector 54 projects into the transport path 32, i.e., clockwise in the drawing, by an unillustrated urging unit such as a spring. Accordingly, in a state in which an external force is not applied to the detector 54, the detector 54 projects into the transport path 32, as shown by the solid line in the drawing, and the shielding portion 56 is positioned between a light emitting portion and a light receiving portion of the photointerrupter 55. As a result, the transmission of the light of the photointerrupter 55 is shielded, and the first front sensor 50 is turned off.

Meanwhile, if the original is place on the paper feed tray 30, the original abuts against the detector 54 and rotates the detector 54 so as to cause the detector 54 to retreat from the transport path 32. The shielding portion 56 is also rotated together with the detector 54, and the shielding portion 56 moves away from between the light emitting portion and the light receiving portion of the photointerrupter 55, as shown by the two-dot chain line in the drawing. As a result, the transmission of the light of the photointerrupter 55 ceases to be shielded, and the first front sensor 50 is turned on. As the first front sensor 50 is turned on or off, whether or not the originals are placed on the paper feed tray 30, i.e., the presence or absence of originals on the paper feed tray 30, is detected. It should be noted that the first front sensor 50 corresponds to the first detecting unit in accordance with the invention.

In addition, the second front sensor 51 disposed immediately downstream of the separation roller 34 is for detecting the leading end or the trailing end of the original fed into the transport path 32 on the basis of its turning on or off. For example, whether or not the trailing end of the original has passed the converging position 38 is determined as the number of revolutions of the transport roller 35 after detection of the trailing end of the original by the second front sensor 51 is monitored by the number of steps or the like of an encoder or the original transporting motor 113.

In addition, the rear sensor 52 disposed immediately upstream of the reading position is for detecting the leading end and the trailing end of the original transported along the transport path 32 on the basis of its turning on and off. Whether or not the leading end or the trailing end of the original has reached the reading position is determined as the number of revolutions of the transport roller 35 after detection of the leading end or the trailing end of the original by the rear sensor 52 is monitored by the number of steps or the like of the encoder or the original transporting motor 113. Image reading by the image reading unit 22 is controlled by a signal from this rear sensor 52. If the leading end of the original reaches the reading position, the image reading is started, and if the trailing end of the original reaches the reading position, the image reading is finished.

In addition, the switchback sensor 53 disposed on the bypath 44 is for detecting the leading end or the trailing end of the original transported along the bypath 44 on the basis of its turning on or off. For example, whether or not the trailing end of the original has passed the converging position 38 is determined as the numbers of revolutions of the transport roller 35 and the switchback roller 42 after detection of the trailing end of the original by the switchback sensor 53 is monitored by the number of steps or the like of the encoder or the original transporting motor 113.

Figure 7:
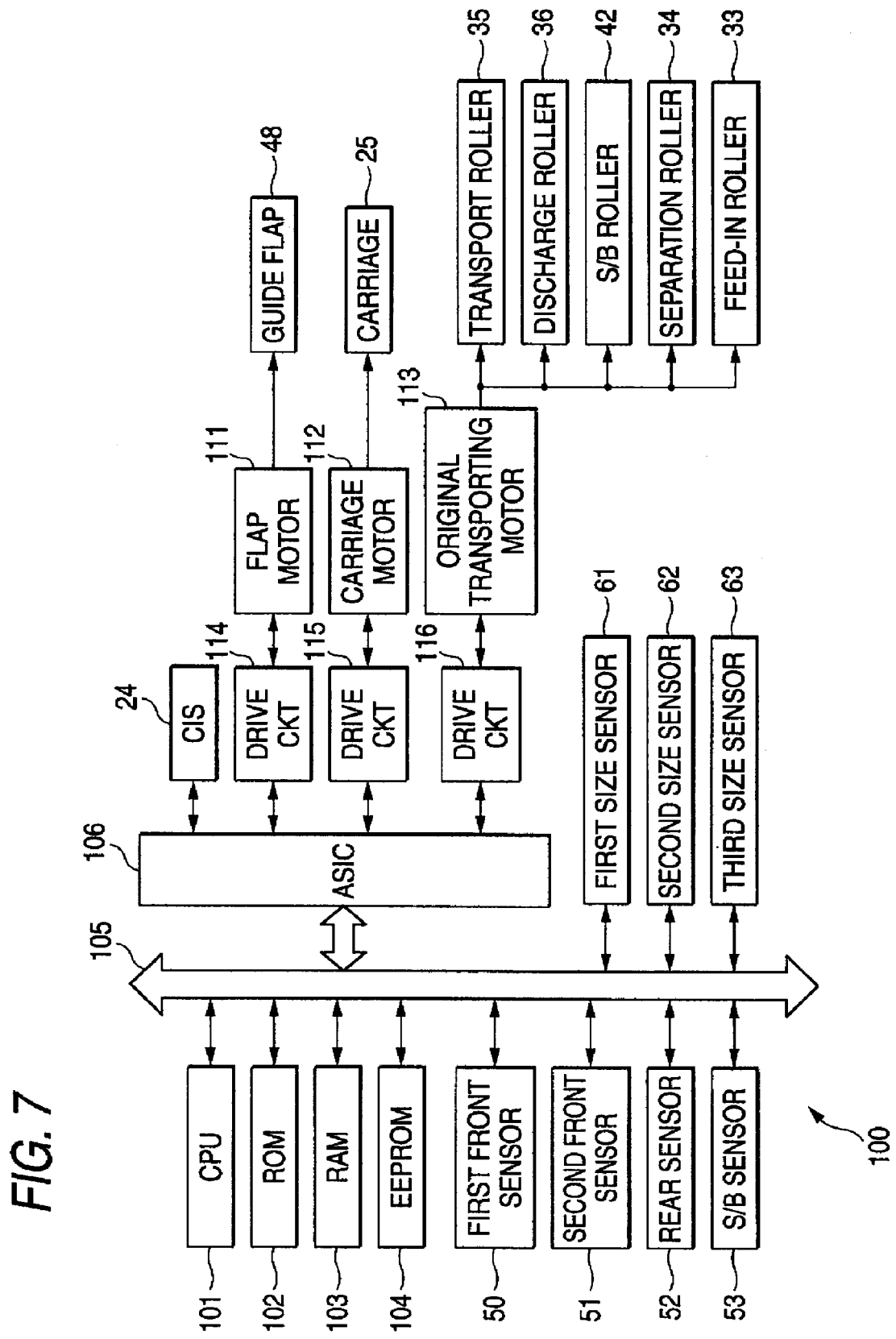
FIG. 7 is a block diagram illustrating the configuration of a control unit 100.

Hereafter, a description will be given of a control unit 100 for controlling the operation of the above-described image reading apparatus 1. FIG. 7 shows the configuration of the control unit 100 of the image reading apparatus 1. The control unit 100 controls the operation of the image reading apparatus 1 including the ADF 3, the image reading unit 22, and the like. As shown in the drawing, the control unit 100 is configured as a microcomputer, which includes a central processing unit (CPU) 101; a read only memory (ROM) 102; a random access memory (RAM) 103; and an electrically erasable and programmable ROM (EEPROM) 104. The control unit 100 is connected to an application specific integrated circuit (ASIC) 106 via a bus 105. Here, the CPU 101 corresponds to the first determining unit and the second determining unit in accordance with the invention.

A program and the like for controlling the various operation of the image reading apparatus 1 are stored in the ROM 102. The RAM 103 is used as a storage area or a work area for temporarily storing various data used when the CPU 101 executes the aforementioned program.

In accordance with instructions from the CPU 101, the ASIC 106 generates phase excitation signals and the like for respectively energizing the flap motor 111 for driving the guide flap 48, the carriage motor 112 for driving the carriage 25, and the original transporting motor 113 for driving the rollers of the transport path 35 and the like of the ADF 3. The ASIC 106 imparts the signals to respective drive circuits 114, 115, and 116 of the flap motor 111, the carriage motor 112, and the original transporting motor 113. As drive signals are applied to the flap motor 111, the carriage motor 112, and the original transporting motor 113 through the drive circuits 114, 115, and 116, the rotation of the flap motor 111, the carriage motor 112, and the original transporting motor 113 is controlled. Here, the drive circuit 114 for effecting the rotation control of the flap motor 111 and the ASIC 106 for generating the phase excitation signals and the like and imparting them to the drive circuit 114 correspond to the controlling unit in accordance with the invention.

The drive circuit 114 is for driving the flap motor 111 connected to the guide flap 48. Upon receiving an output signal from the ASIC 106, the drive circuit 114 generates an electrical signal for rotating the flap motor 111. Upon receiving the electrical signal, the flap motor 111 rotates, and its torque is transmitted to the shaft 49 of the guide flap 48, thereby swinging the guide flap 48. As a result, the transport route of the originals is changed over.

The drive circuit 115 is for driving the carriage motor 112 connected to the carriage 25 for supporting the image reading unit 22. Upon receiving an output signal from the ASIC 106, the drive circuit 115 generates an electrical signal for rotating the carriage motor 112. Upon receiving the electrical signal, the carriage motor 112 rotates, and the torque of the carriage motor 112 is transmitted to the carriage 25 through a known scanning mechanism, thereby moving the carriage 25. As a result, the image reading unit 22 is moved.

The drive circuit 116 is for driving the original transporting motor 113 connected to the respective ones of the separation roller 34, the transport roller 35, the discharge roller 36, and the switchback roller 42 of the ADF 3. Upon receiving an output signal from the ASIC 106, the drive circuit 116 generates an electrical signal for rotating the original transporting motor 113. Upon receiving the electrical signal, the original transporting motor 113 rotates, and the torque of the original transporting motor 113 is transmitted to the respective rollers through a known drive mechanism consisting of gears, drive shafts, and the like. The feed-in roller 33 is rotatively driven as torque is transmitted from the separation roller 34 to the feed-in roller 33 through a drive transmitting mechanism.

The CIS image sensor 24 constituting the image reading unit 22 is connected to the ASIC 106. On the basis of a command from the CPU 101, the SSIC 106 imparts to the CIS image sensor 24 an electrical signal for applying light from a light source and a timing signal for outputting image data from a photoelectric transducer. The CIS image sensor 24, upon receiving these signals, applies light to the original at a predetermined timing and outputs image data converted by the photoelectric transducer.

The respective sensors, that is the first front sensor 50, the second front sensor 51, the rear sensor 52, the switchback sensor 53, the first size sensor 61, the second size sensor 62, and the third size sensor 63, which are disposed on the transport path 32, the bypath 44, and the paper feed tray 30, are connected to the CPU 101, the ROM 102, the RAM 103, the EEPROM 104, and the ASIC 106 through the bus 105, as illustrated in the drawing. The states of sensor output signals from the aforementioned sensors are monitored by the CPU 101, and a predetermined command is issued to the ASIC 106 on the basis of a change in their states.

Figure 8:
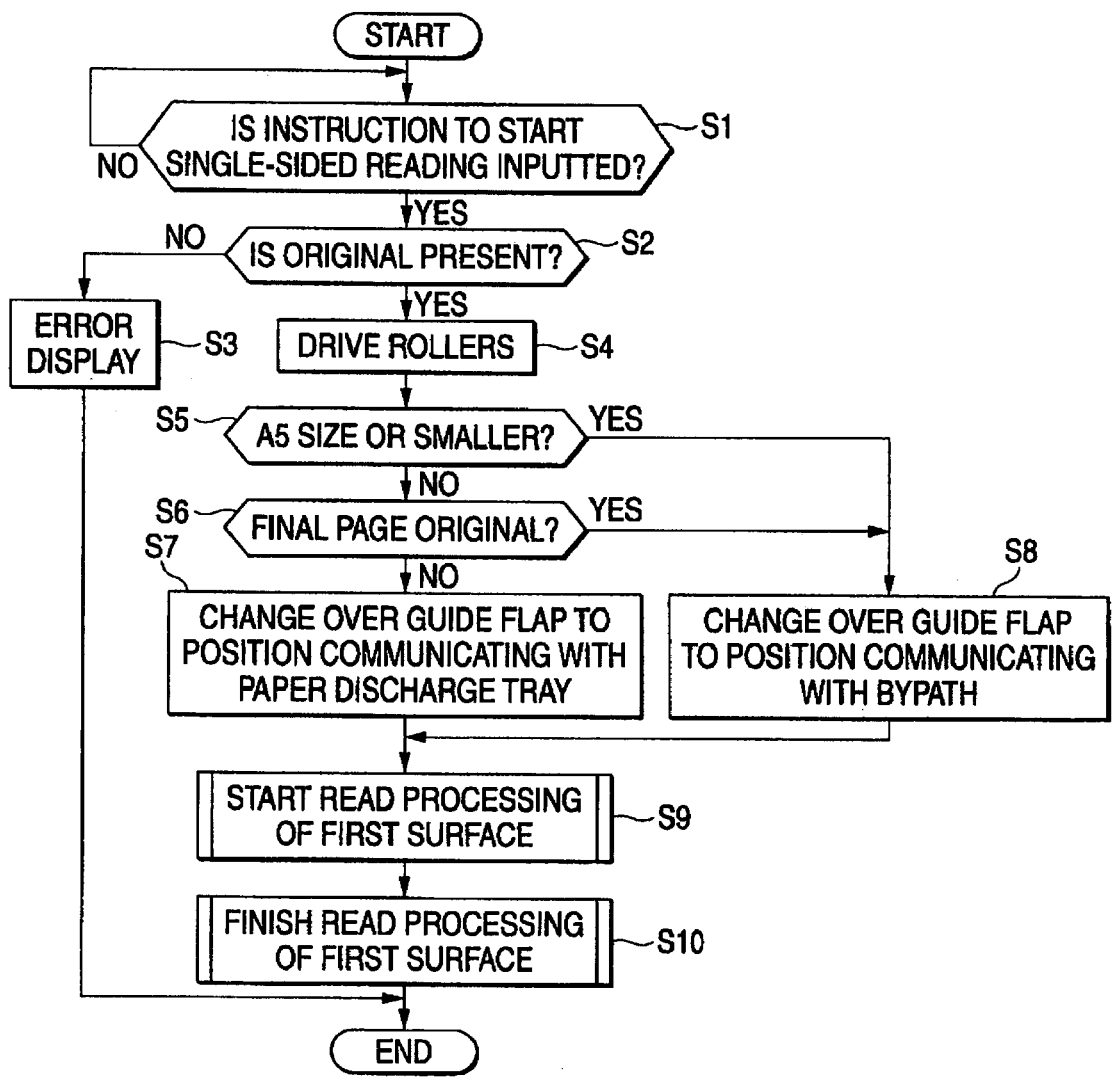
FIG. 8 is a flowchart illustrating the processing procedure which is executed by the control unit 100 at the time of single-sided reading.

Hereafter, referring to FIGS. 8 to 17, a description will be given of the single-sided reading operation by this image reading apparatus 1 and the processing procedure which is executed by the control unit 100 at the time of the single-sided reading. Here, FIG. 8 is a flowchart illustrating the processing procedure which is executed by the control unit 100, and FIGS. 9 to 17 are schematic diagrams explaining the image reading operation at the time of the single-sided reading. It should be noted that S1, S2, . . . in FIG. 8 indicate the numbers of the processing procedure (steps).

Figure 9:
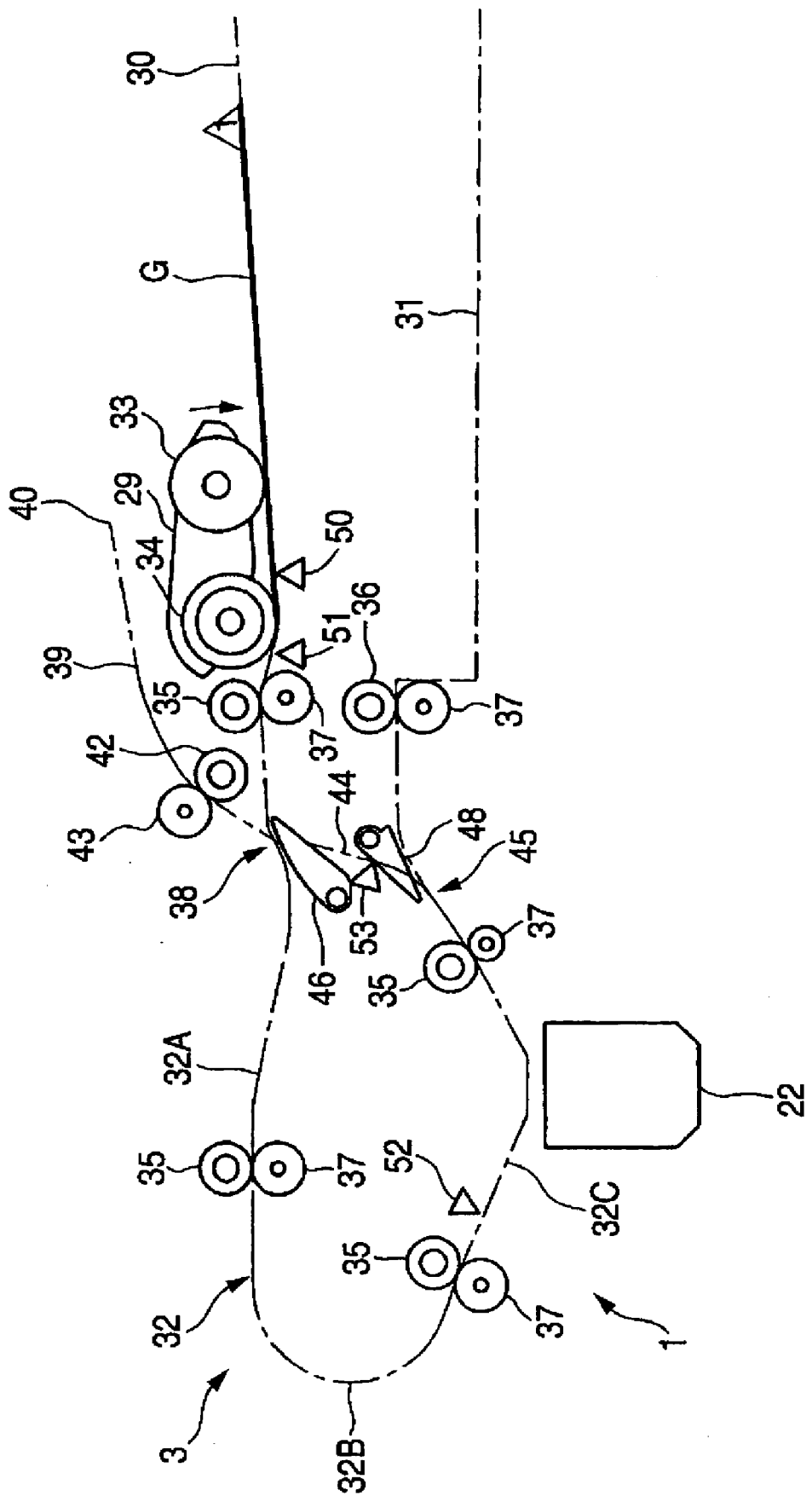
FIG. 9 is a schematic diagram explaining the image reading operation at the time of the single-sided reading.

This image reading apparatus 1 can be used as the FBS, and it is also possible to use the ADF 3. However, since the use of the FBS is not particularly related to the invention, a detailed thereof will be omitted. In the case where the ADF 3 is used, the original cover 4 is set in a state of being closed onto the original placing table 2. Then, as shown in FIG. 9, an original or originals G to be read are placed on the paper feed tray 30. The originals G are placed on the paper feed tray 30 such that the reading surface (a first surface) becomes the upper side, i.e., in the so-called face up position. For example, when the image reading of a plurality of originals G of the same size is effected, the originals G are placed on the paper feed tray 30 after being arranged in order and superposed one on top of another such that the first surface of the first page of each original G faces upward.

First, when an instruction to start singe-sided reading is inputted to the image reading apparatus 1 (YES in S1), whether or not an original or originals G are placed on the paper feed tray 30 is determined by the first front sensor 50 (S2). Specifically, the presence or absence of the original or originals G is detected by the CPU 101 on the basis of a sensor output signal from the first front sensor 50. If there is no original G placed on the paper feed tray 30, an error display of "NO ORIGINAL" is given on an unillustrated display portion of the image reading apparatus 1 (S3).

On the other hand, if the original or originals G are placed on the paper feed tray 30, an "on" signal or an "off" signal which is outputted from each of the first size sensor 61, the second size sensor 62, and the third size sensor 63 which are disposed on the paper feed tray 30 is read by the CPU 101, and that information is temporarily stored in the RAM 103. The information stored in the RAM 103 is used in the processing (S5) for determining the size of the original which will be described later.

Subsequently, the carriage motor 112 and the original transporting motor 113 are driven, and the feed-in roller 33, the separation roller 34, the transport roller 35, the discharge roller 36, and the switchback roller 42 are rotatively driven at predetermined timings (S4). In addition, as the original transporting motor 113 is driven, the driving force is transmitted, and the arm 29 is lowered downward, allowing the feed-in roller 33 to be brought into pressure contact with the original G or an uppermost one of the originals G on the paper feed tray 30. Then, as the feed-in roller 33 and the separation roller 34 rotate, the original G is paid into the transport path 32. In the case where a plurality of originals G are placed on the paper feed tray 30, there are cases where an original immediately below the original G at the uppermost position is also fed in an overlapping manner, but that original is blocked by the separation pad provided at a position opposing the separation roller 34.

In the transport path 32, the driving force from the original transporting motor 113 is transmitted to the transport roller 35 and the discharge roller 36, and these rollers are rotated to transport the original G from the upstream side to the downstream side of the transport path 32. The original G fed from the paper feed tray 30 into the transport path 32 is nipped by the transport roller 35 and the pinch roller 37, and torque is thereby transmitted to it. The original G is thus transported along the transport path 32 and is transported through the converging position 38 toward the upstream side of the reading position of the transport path 32. In contrast to the fact that the transport route from the paper feed tray 30 side of the transport path 32 toward the reading position is substantially rectilinear, the transport route from the paper feed tray 30 side of the transport path 32 to the switchback path 39 is bent at an acute angle, so that the original G fed from the paper feed tray 30 does not enter the switchback path 39. In addition, the transport route from the converging position 38 to the bypath 44 is closed by the guide flap 46. Accordingly, the original G is guided at the converging position 38 to the upstream side of the reading position by the guide flap 46.

Subsequently, a determination is made as to whether or not the size of the original G on the paper feed tray 30 is the A5 size or smaller (S5). Such determination processing is effected by the CPU 101 on the basis of sensor output signals ("on" or "off" signals) from the first size sensor 61, the second size sensor 62, and the third size sensor 63. Specifically, information concerning "on" signals or "off" signals stored in advance in the RAM 103 is read by the CPU 101, and the aforementioned determination processing is carried out on the basis of that information. As for the size of the original G, if "on" signals are outputted from all the size sensors, the size is determined to be A4. If "on" signals are outputted from the first size sensor 61 and the second size sensor 62, and an "off" signal is outputted from the third size sensor 63, the size is determined to be B5. If an "on" signal is outputted from the first size sensor 61, and "off" signals are outputted from the second size sensor 62 and the third size sensor 63, the size is determined to be A5. If "off" signals are outputted from all the size sensors, the size is determined to be smaller than A5. It should be noted that although in this aspect the A5 size is set as the criterion in the aforementioned step S5, the criterion can be set arbitrarily. As the CPU 101 executes the above-described determination processing (S5), the second determining unit in accordance with the invention is embodied.

Here, if it is determined that the size of the original or originals G is larger than the A5 size (NO in S5), a determination as to whether or not the original G is a final page original is carried out by the CPU 101 (S6). This determination is effected on the basis of the state of a sensor output signal from the first front sensor 50 after the original G has been fed from the paper feed tray 30. For example, a determination is made that it is a final page original on the basis of the fact that the sensor output signal from the first front sensor 50 has changed from on to off after the feeding of the original G from the paper feed tray 30. More specifically, the state of the first front sensor 50 is monitored by the CPU 101 when the second front sensor 51 changes from on to off as a result of the fact that the trailing end of the original G fed has passed the second front sensor 5. If the first front sensor 50 at that time is off, the original G fed is determined to be a final page original, whereas if it is on, it is determined that an original G remains on the paper feed tray 30, i.e., the original G in question is not a final original. As the CPU 101 executes such determining processing (S6), the second determining unit in accordance with the invention is embodied.

Figure 10:
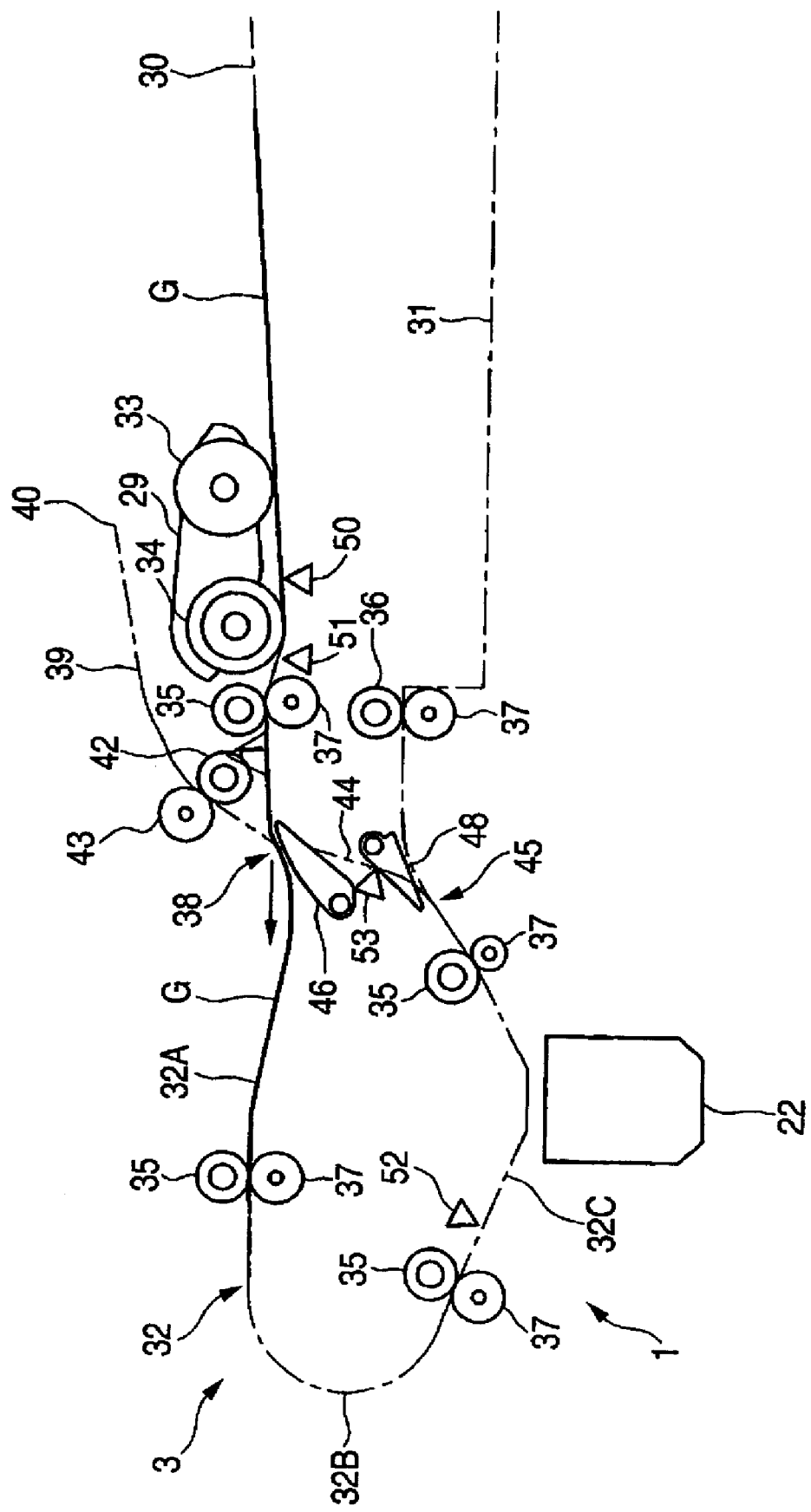
FIG. 10 is a schematic diagram explaining the image reading operation at the time of the single-sided reading.
Figure 11:
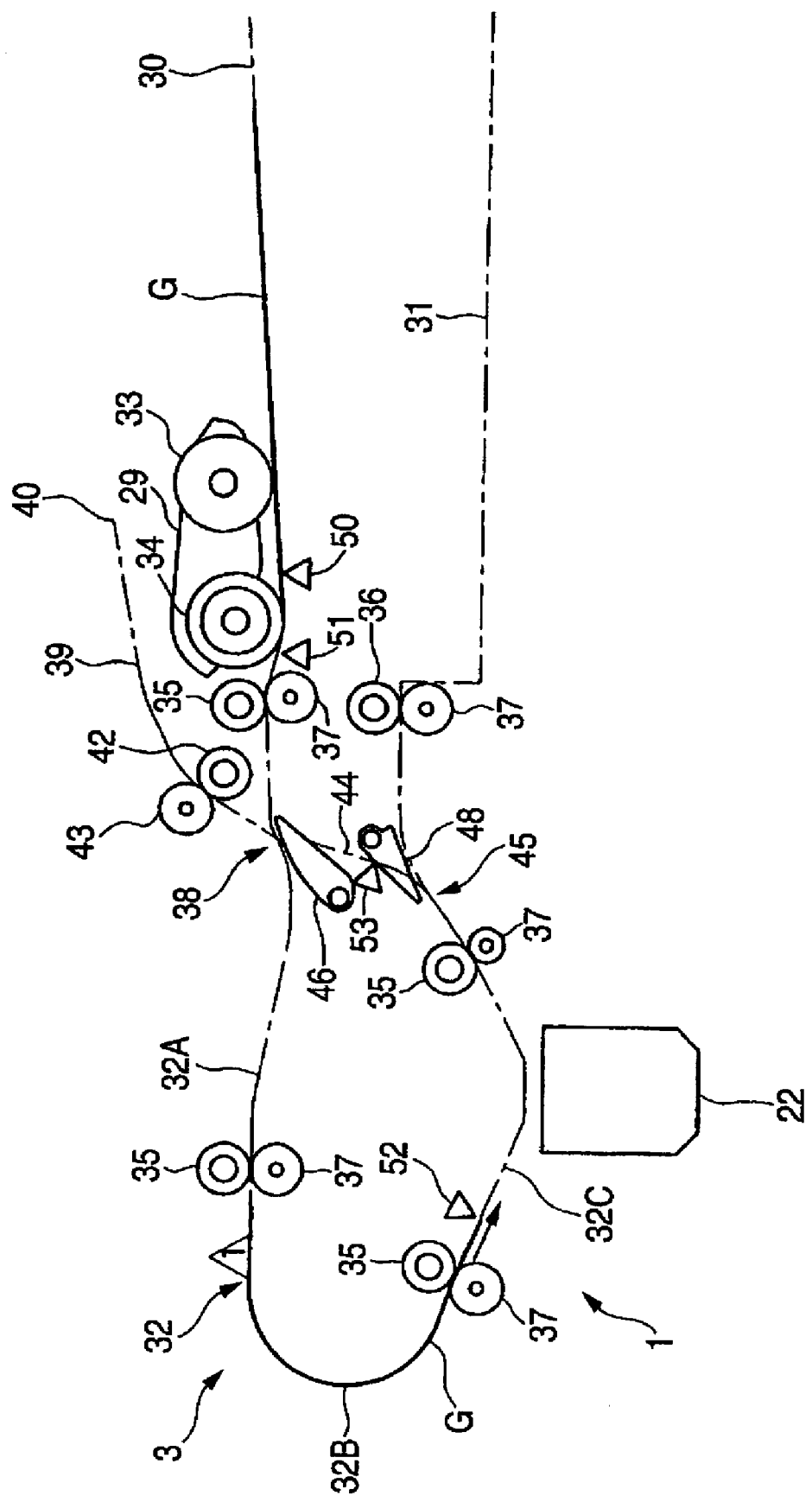
FIG. 11 is a schematic diagram explaining the image reading operation at the time of the single-sided reading.

If it is determined in the aforementioned step S6 that the original is not a final page original (NO in S6), the flap motor 111 is controlled to change over the guide flap 48 so as to allow the transport route at the branching position 45 to be continuous from the reading position side to the paper discharge tray 31 side of the transport path 32 (S7), as shown in FIG. 10. It should be noted that in the state in which the original G does not abut, the guide flap 46 at the converging position 38 is at the position for allowing the transport route at the converging position 38 to be continuous from the paper feed tray 30 side to the reading position side of the transport path 32, Then, as shown in FIG. 11, when the original G is transported so as to be inverted downward by the curved portion 32B of the transport path 32, its leading end is detected by the rear sensor 52. The leading end of the original G, upon detection by the rear sensor 52, reaches the reading position after the lapse of a predetermined time. By timing its arrival, the image reading of the original G by the image reading unit 22 is started (S9).

Figure 12:
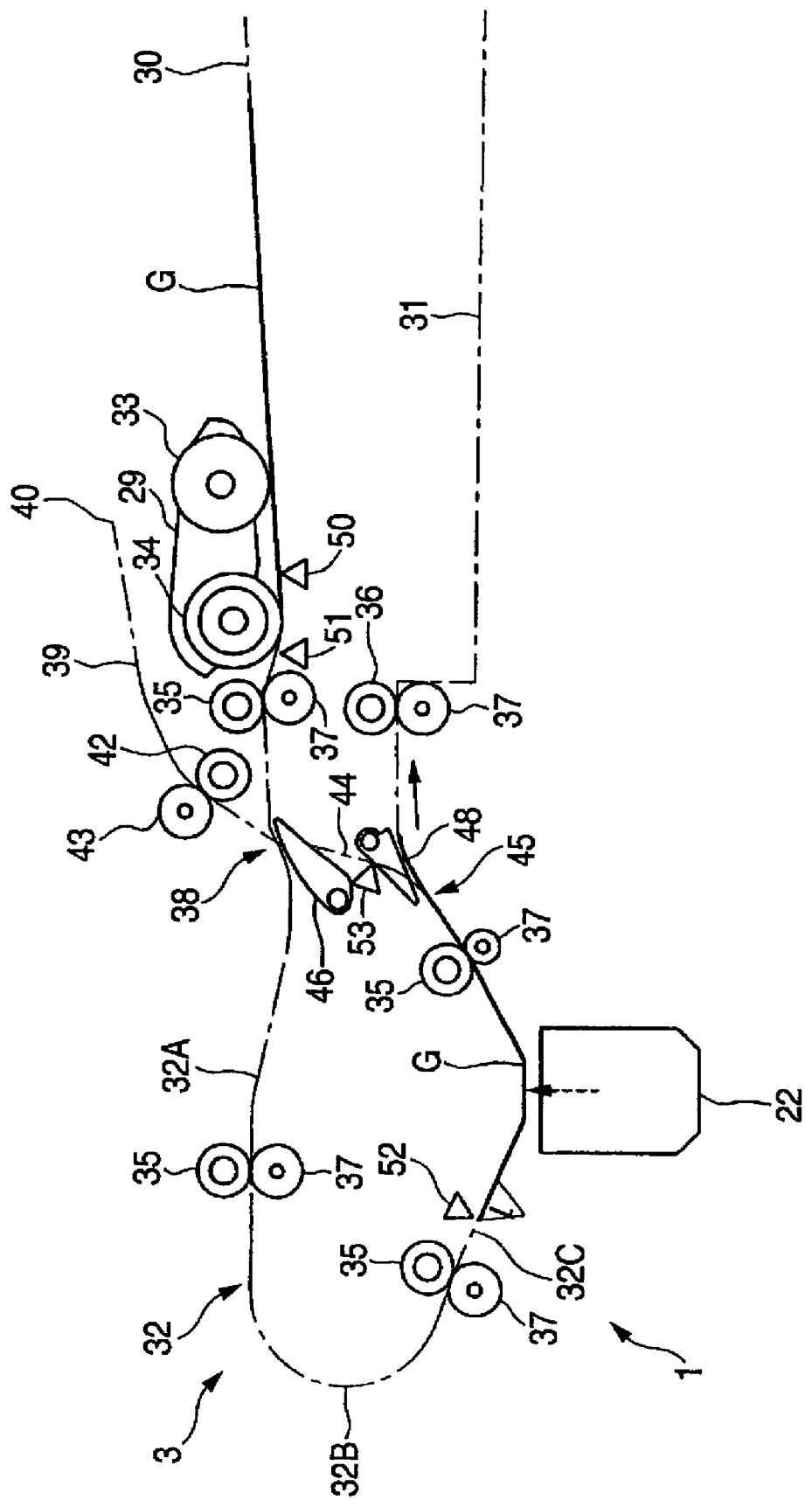
FIG. 12 is a schematic diagram explaining the image reading operation at the time of the single-sided reading.

As shown in FIG. 12, the original G passes the reading position such that its first surface opposes the image reading unit 22. During this passage, the image on the first surface of the original G is read by the image reading unit 22. Then, after the lapse of a predetermined time upon detection of the trailing end of the original G by the rear sensor 52, the image reading of the original G by the image reading unit 22 is finished (S10).

Figure 13:
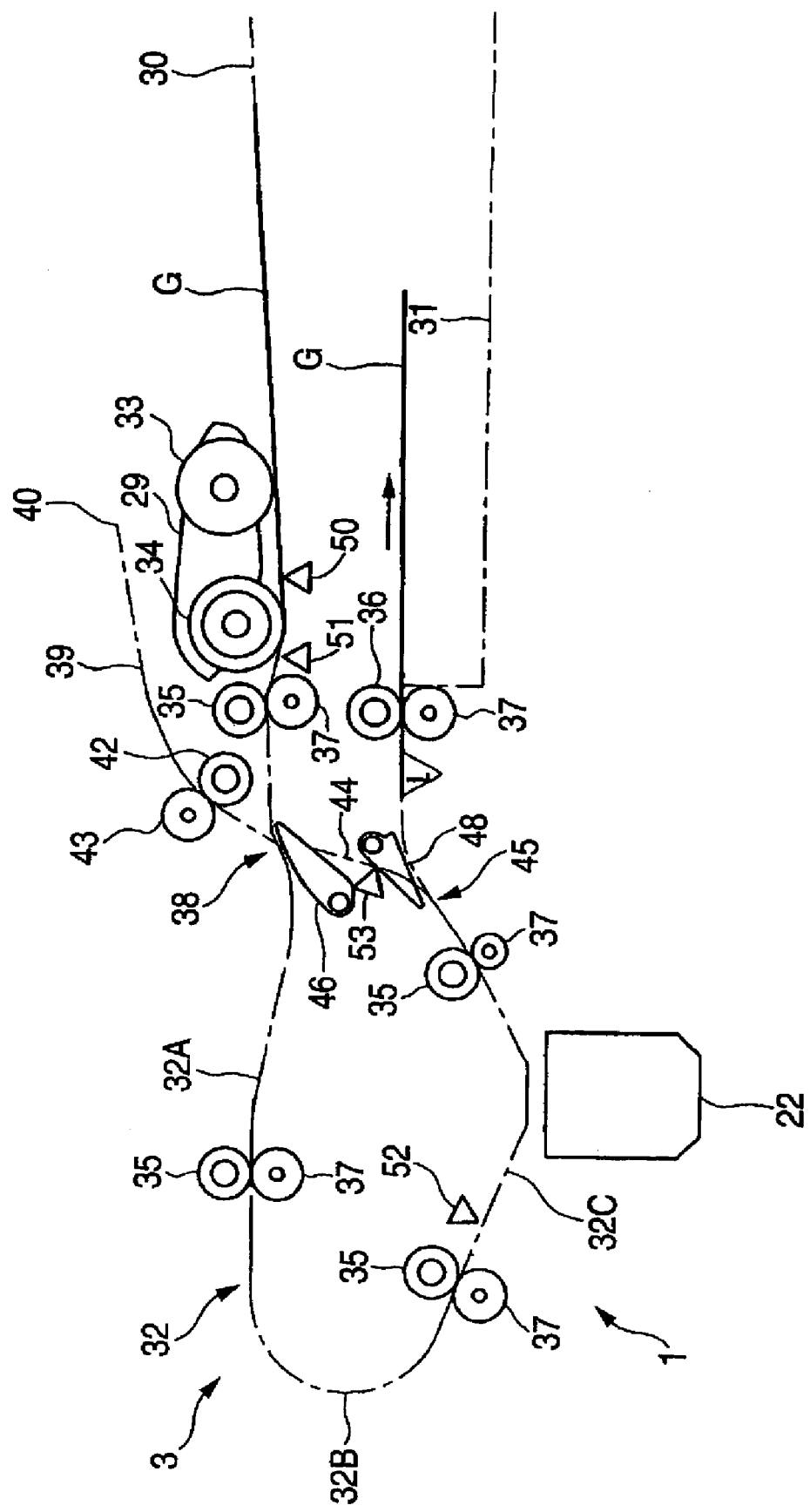
FIG. 13 is a schematic diagram explaining the image reading operation at the time of the single-sided reading.

The original G after the image reading is guided by the guide flap 48 at the branching position 45, and is transported toward the paper discharge tray 31 side of the transport path 32. Then, as shown in FIG. 13, the original G is nipped by the discharge roller 36 and the pinch roller 37, and is discharged from the transport path 32 onto the paper discharge tray 31. Subsequently, an ensuing original G set on the paper feed tray 30 is fed into the transport path 32, and the above-described series of operations is repeated, whereby the originals G on the paper teed tray 30 are transported one sheet at a time, and image reading is performed.

Figure 14:
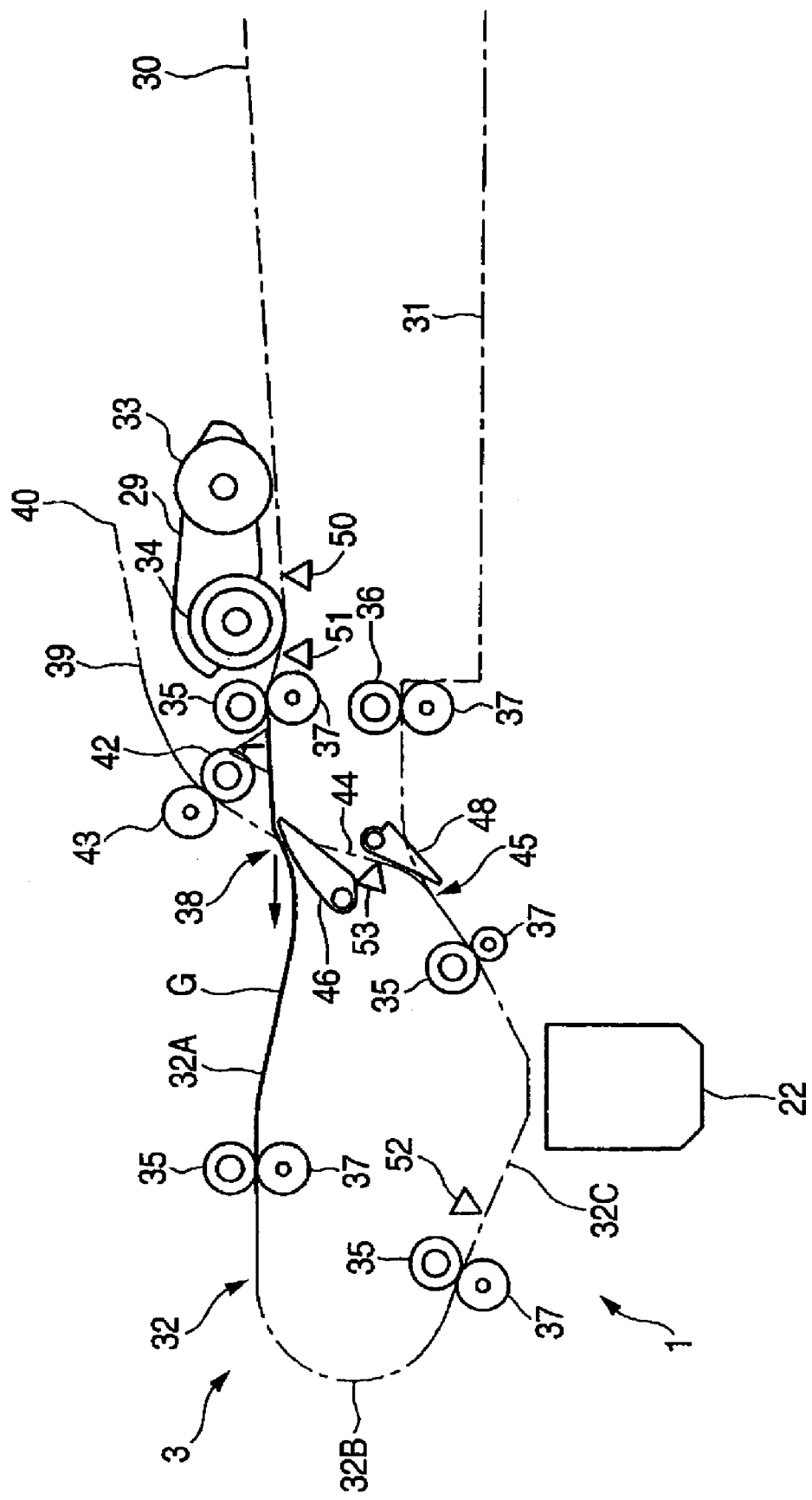
FIG. 14 is a schematic diagram explaining the image reading operation at the time of the single-sided reading.

If it is determined in the previous step S5 that the original G is the A5 size or smaller (YES in S5), or if it is determined in the previous step S6 that the original G is a final page original (YES in S6), the flap motor 111 is controlled to change over the guide flap 48 so as to allow the transport route at the branching position 45 to be continuous from the reading position side to the bypath 44 side of the transport path 32 (S8), as shown in FIG. 14.

Figure 15:
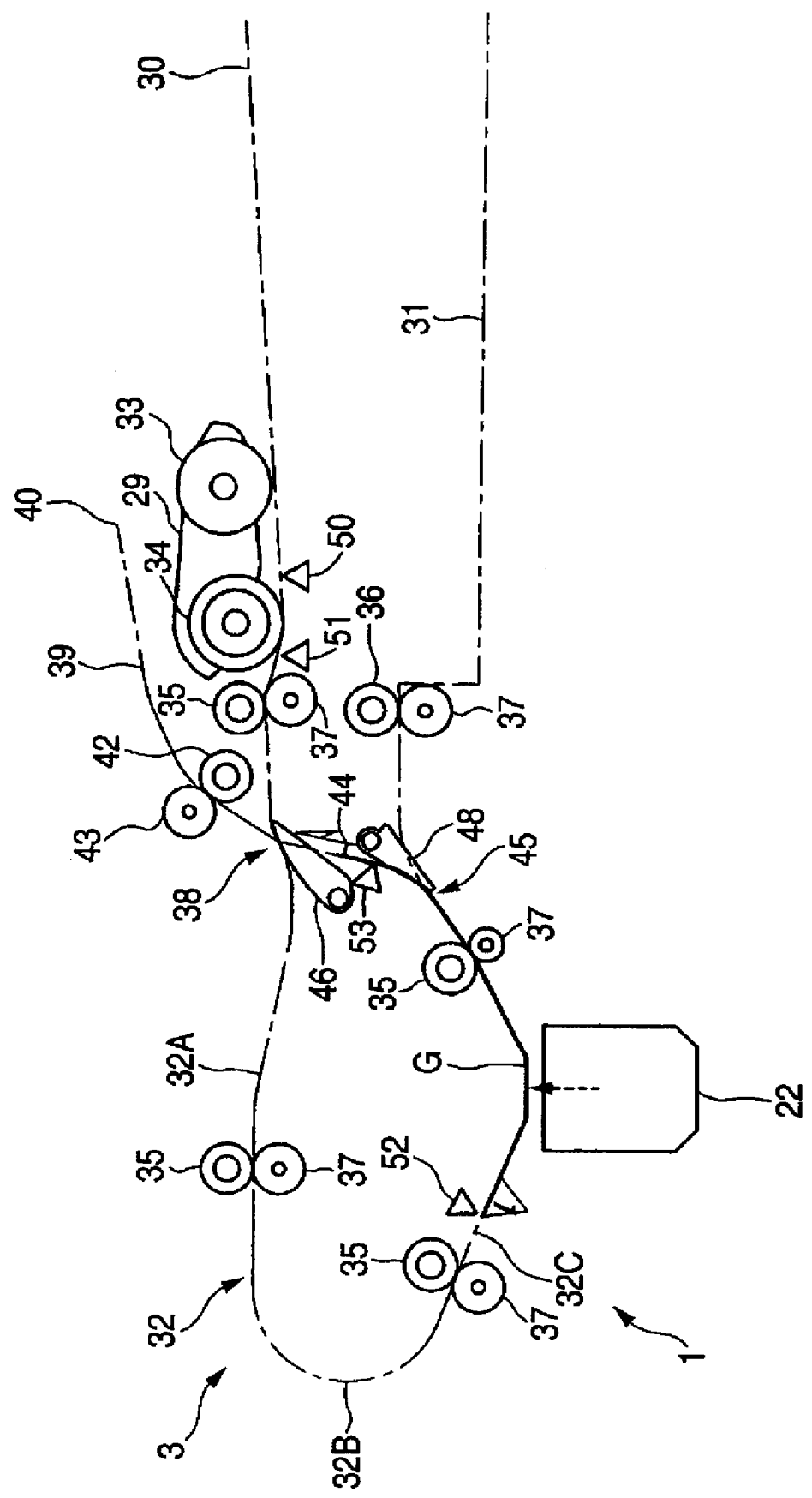
FIG. 15 is a schematic diagram explaining the image reading operation at the time of the single-sided reading.

When the original G is transported, and the image on the first surface is read by the image reading unit 22 at the reading position, as described above, the original G after having been read is guided by the guide flap 48, and advances from the transport path 32 into the bypath 44 at the branching position 45, as shown in FIG. 15.

Figure 16:
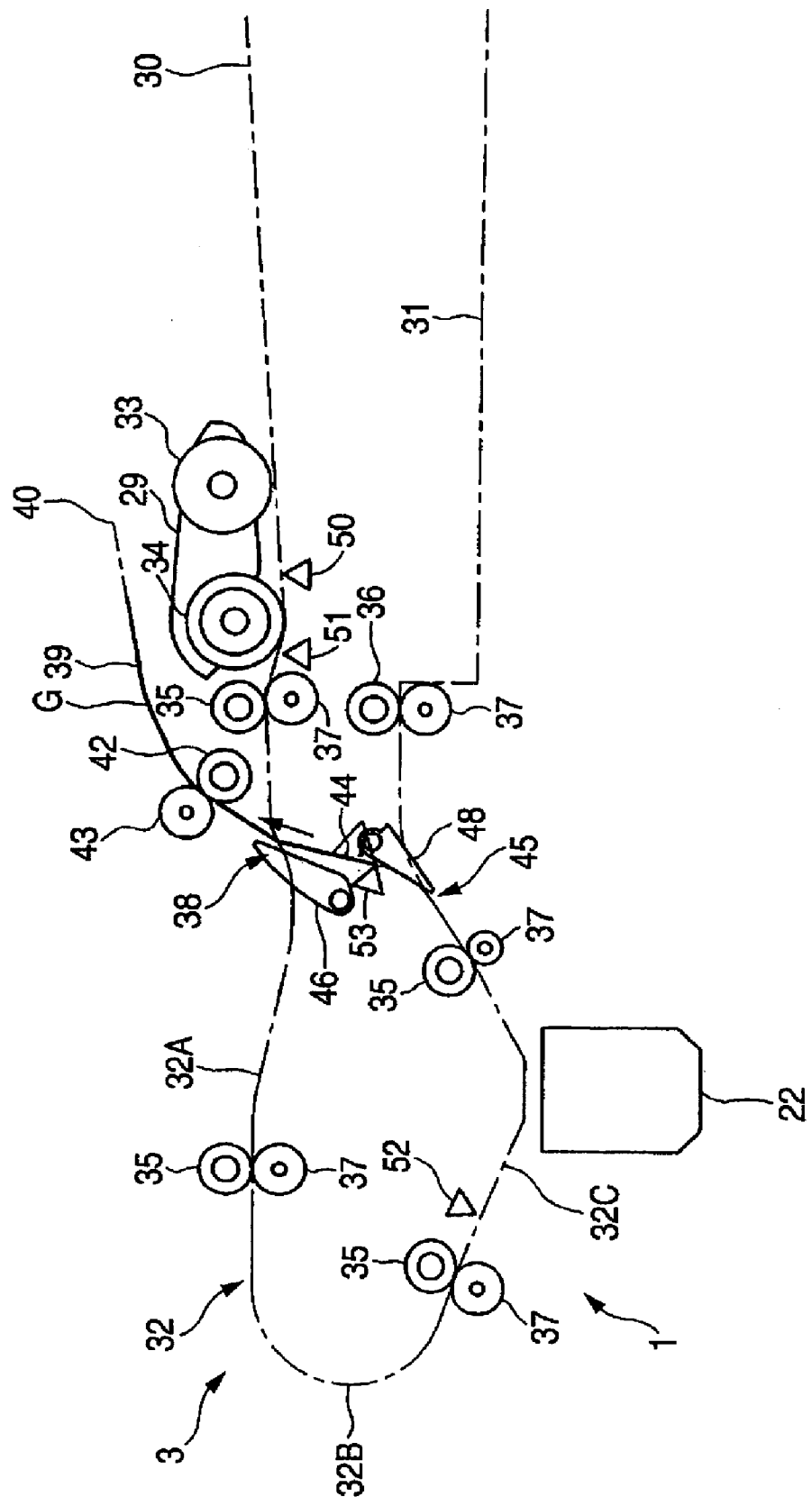
FIG. 16 is a schematic diagram explaining the image reading operation at the time of the single-sided reading.
Figure 17:
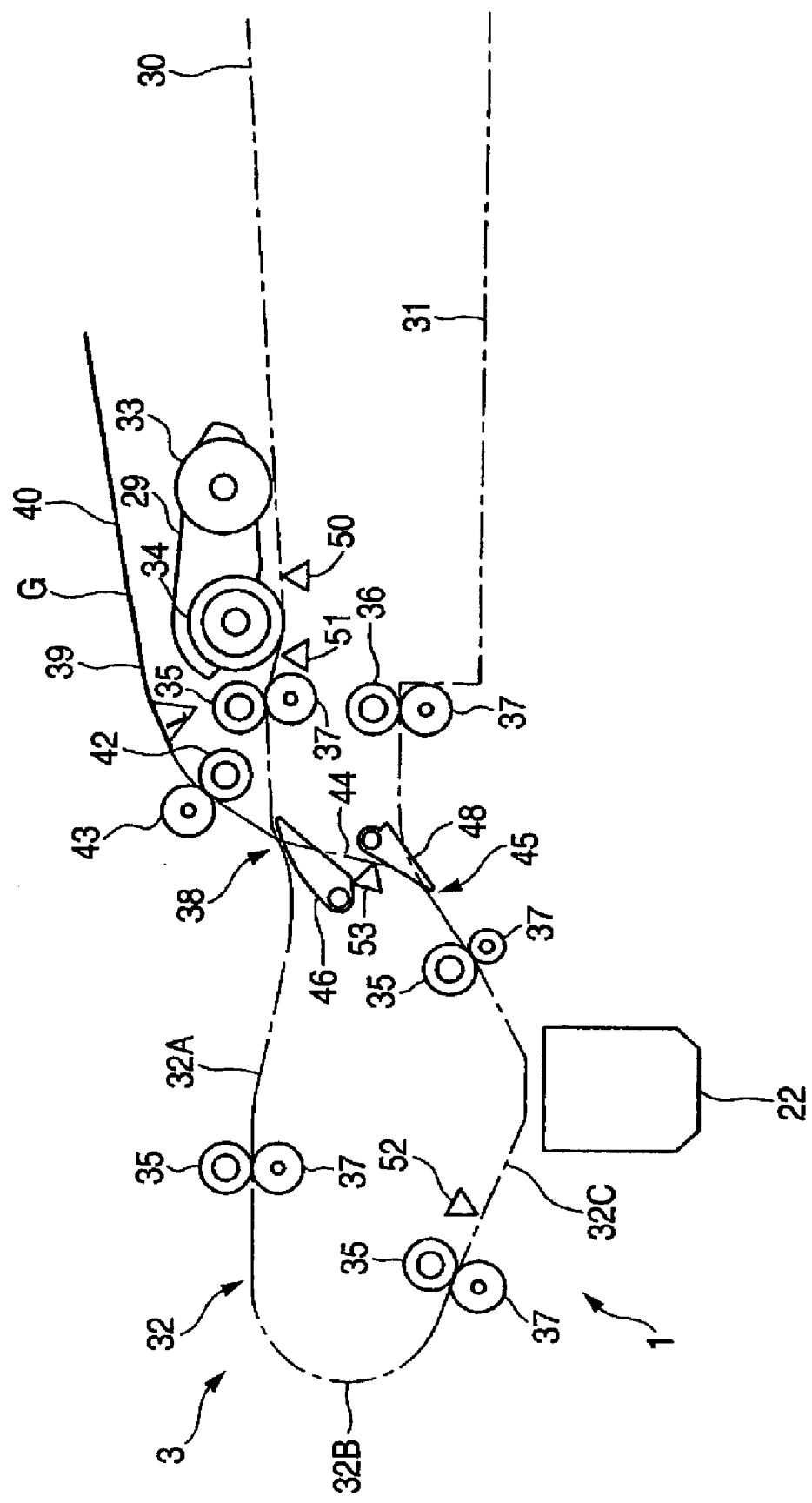
FIG. 17 is a schematic diagram explaining the image reading operation at the time of the single-sided reading.

As shown in FIG. 16, the original G which has entered the bypath 44 abuts against the guide flap 46, pushes the guide flap 46 upward, and enters the switchback path 39 from the bypath 44 at the converging position 38. Namely, at the converging position 38, the guide flap 46 guides the original G so as to allow the straight advance of the original G from the bypath 44 into the switchback path 39. Since the transport route from the bypath 44 to the switchback path 39 is substantially rectilinear, the original G at the branching position straightly advances to enter the switchback path 39 without entering the paper feed tray 30 side of the transport path 32. The original G is then nipped by the switchback roller 42 and the pinch roller 43, and is transported to the final end 40 side along the switchback path 39 by the rotation of the switchback roller 42.

When the original G has completely entered the switchback path 39, the original G is transported toward the final end 40 by receiving the torque from the switchback roller 42. Subsequently, the original G is released from the nip between the switchback roller 42 and the pinch roller 43 and assumes a state in which it is exposed from the final end 40 of the switchback path 39 to outside the ADF 3. At this time, the original G becomes stationary in a state in which it is clamped by the original presser 28 provided at the final end 40. At that juncture, the exposed leading end side of the original G is supported by the original supporting portion 41. Subsequently, in the case where the original G is a final page original, the series of image reading operation is finished. It should be noted that in a case where there is an ensuing original of the A5 size or smaller, the above-described operation is repeated.

Figure 18:
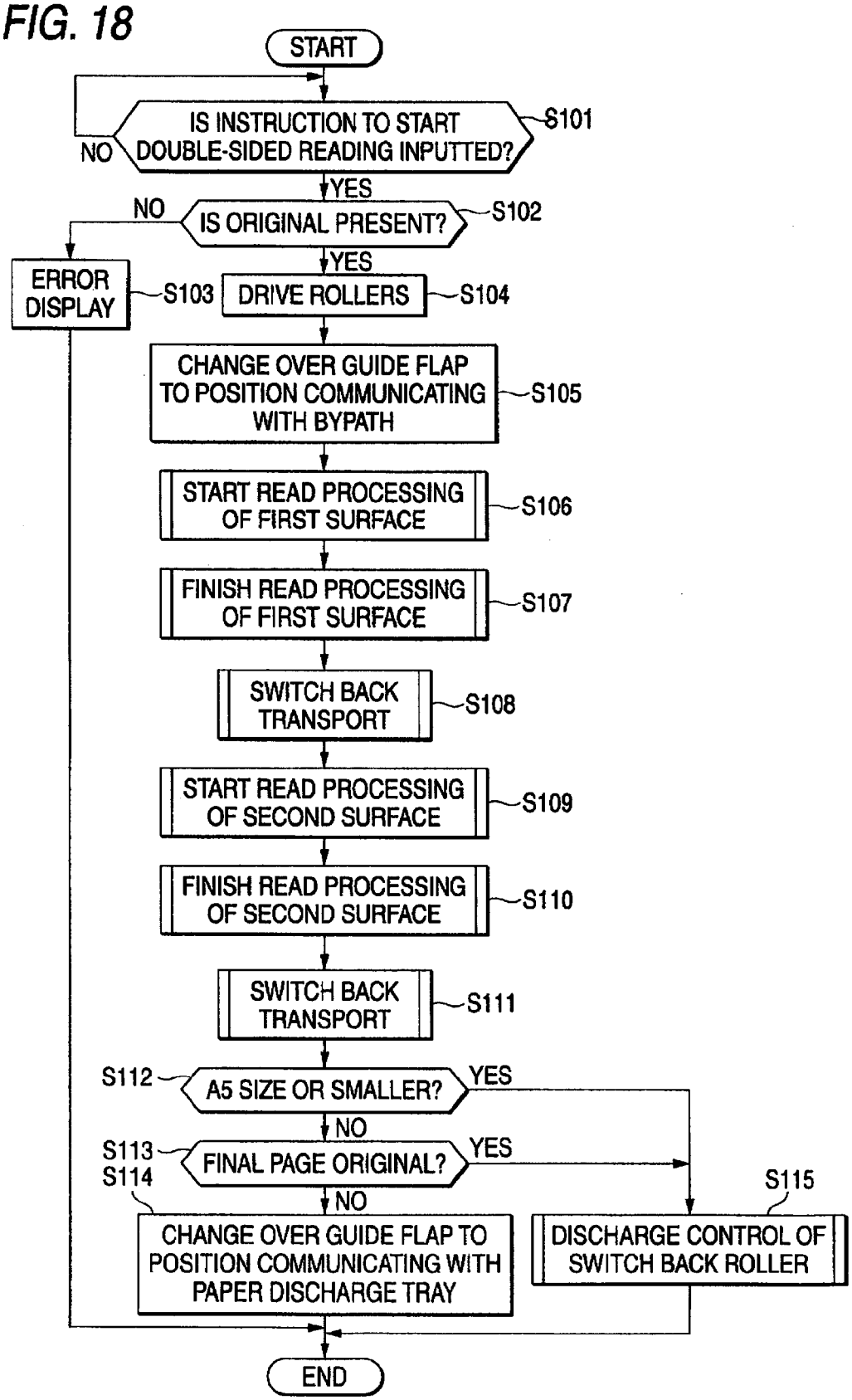
FIG. 18 is a flowchart illustrating the processing procedure which is executed by the control unit 100 at the time of double-sided reading.

Next, referring to FIGS. 18 to 29, a description will be given of double-sided reading operation by this image reading apparatus 1, as well as the processing procedure which is executed by the control unit 100 at the time of the double-sided reading. Here, FIG. 18 is a flowchart showing the processing procedure which is executed by the control unit 100 at the time of the double-sided reading. FIGS. 19 to 29 are schematic diagrams explaining the image reading operation at the time of the double-sided reading. It should be noted that S101, S102, . . . in FIG. 18 indicate the numbers of the processing procedure (steps).

Figure 19:
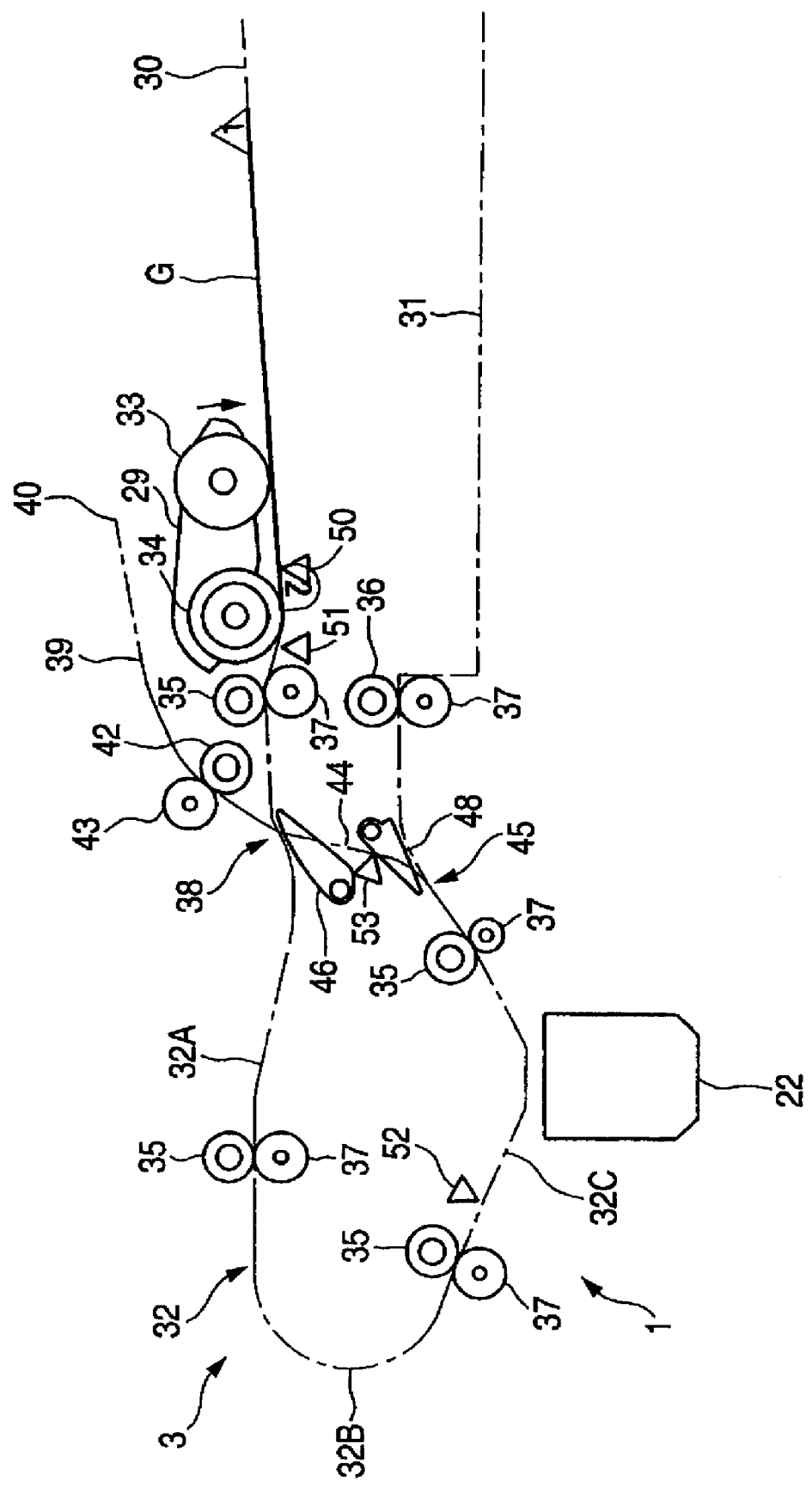
FIG. 19 is a schematic diagram explaining the image reading operation at the time of the double-sided reading.

As shown in FIG. 19, prior to the feeding of the original G, the guide flap 46 is at the position for allowing the transport route at the converging position 38 to be continuous from the paper feed tray 30 side to the reading position side of the transport path 32. It should be noted that in the drawing the surface indicated by "1" on the original G is the first surface which is read first in the double-sided reading, and the surface indicated by "2" on the original G is the second surface which is read later, the first surface and the second surface being in the relationship of obverse and reverse surfaces.

First, when an instruction to start double-sided reading is inputted to the image reading apparatus 1 (YES in S101), then in the same way as in the case of the single-sided reading whether or not an original or originals G are placed on the paper feed tray 30 is detected by the first front sensor 50 (S102). If there is no original G placed on the paper feed tray 30, an error display of "NO ORIGINAL" is given on the unillustrated display portion of the image reading apparatus 1 (S103). On the other hand, if an original or originals G are placed on the paper feed tray 30, an "o" signal or an "off" signal which is outputted from each of the first size sensor 61, the second size sensor 62, and the third size sensor 63 is read, and that information is temporarily stored in the RAM 103. Subsequently, the carriage motor 112 and the original transporting motor 113 are driven, and the feed-in roller 33, the separation roller 34, the transport roller 35, the discharge roller 36, and the switchback roller 42 are rotatively driven at predetermined timings (S104).

In addition, as the original transporting motor 113 is driven, the arm 29 is lowered, and the feed-in roller 33 and the separation roller 34 are rotated, so that the original G is paid into the transport path 32. In the transport path 32, the transport roller 35 is rotated so as to transport the original G from the upstream side to the downstream side. The original G fed from the paper feed tray 30 into the transport path 32 is guided by the guide flap 46 at the converging position 38 and is transported toward the reading position side of the transport path 32.

Figure 20:
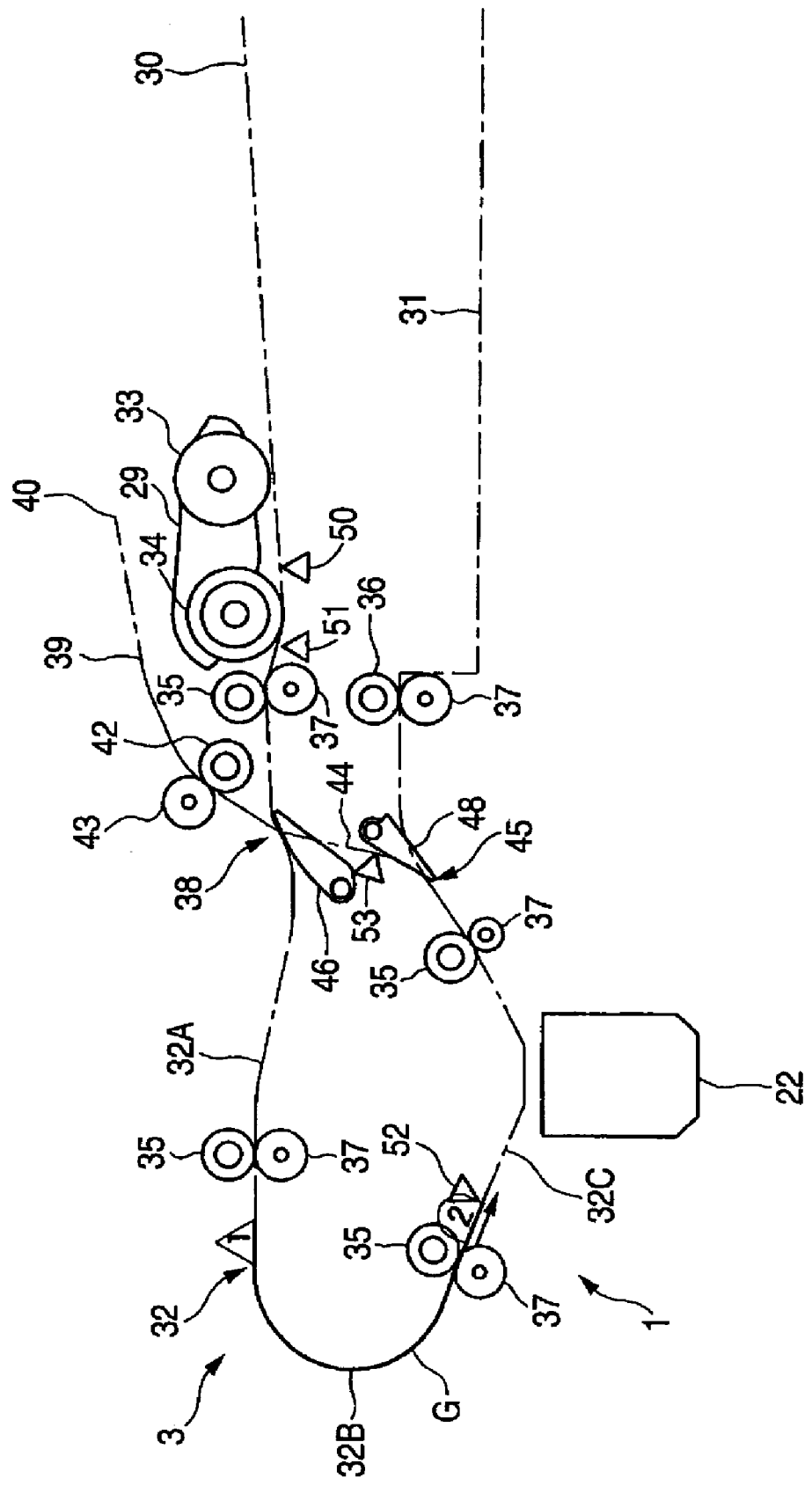
FIG. 20 is a schematic diagram explaining the image reading operation at the time of the double-sided reading.

As shown in FIG. 20, when the original G fed into the transport path 32 reaches a position between the converging position 38 and the branching position 45 of the transport path 32, the guide flap 48 is swung to change over the transport route (S105). More specifically, after the trailing end of the original G has been detected by the second front sensor 51, the trailing end of the original G passes the converging position 38 after the lapse of a predetermined time. Accordingly, on the basis of the detection signal from the second front sensor 51 and the distance of transport by the transport roller 35 or the counting of the time, it is possible to determine that the original G has reached the position between the converging position 38 and the branching position 45 of the transport path 32. Subsequently, the guide flap 48 is changed over by the driving the flap motor 111, to allow the transport route at the branching position 45 to communicate with the bypath 44 from the reading position side of the transport path 32.

It should be noted that in this aspect after the original G has reached the position between the converging position 38 and the branching position 45 of the transport path 32, the guide flap 48 is changed over to allow the transport route at the branching position 45 to be continuous from the reading position side to the paper discharge tray 31 side of the transport path 32. However, an arrangement may be provided such that when double-sided reading and a reading start are inputted to the image reading apparatus 1, and the original G is fed into the transport path 32, the guide flap 48 is changed over to allow the transport route at the branching position 45 to communicate with the bypath 44 from the reading position side of the transport path 32. By so doing, in a case where the length of the transport route from the converging position 38 of the transport path 32 to the branching position 45 via the reading position is shorter than the length in the transporting direction of the largest readable original, the leading end of the largest-size original G can be guided to the bypath 44 when the trailing end of that original G passes the converging position 38.

Figure 21:
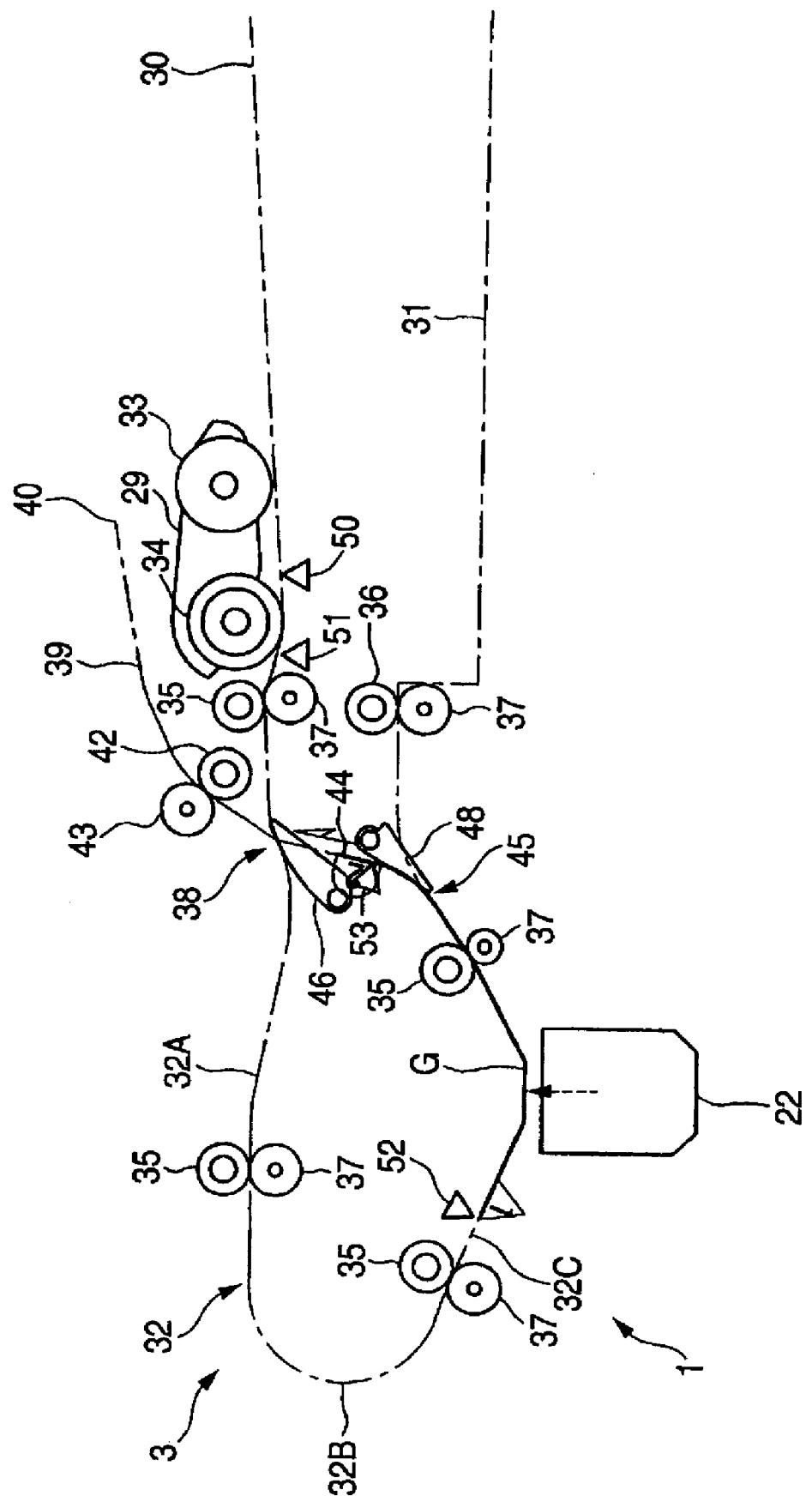
FIG. 21 is a schematic diagram explaining the image reading operation at the time of the double-sided reading.

Then, the original G is transported in such a manner as to be inverted downward by the curved portion 32B of the transport path 32. When its leading end is detected by the rear sensor 52, and that leading end reaches the reading position, the image reading of the first surface of the original G is started by the image reading unit 22 (S106). In addition, as shown in FIG. 21, the original G whose first surface has been read is guided by the guide flap 48 and enters the bypath 44 from the transport path 32 at the branching position 45. It should be noted that if the tailing end of the original G is detected by the rear sensor 52, and that trailing end reaches the reading position, the image reading unit 22 finishes the image reading of the first surface of the original G (S107).

Figure 22:
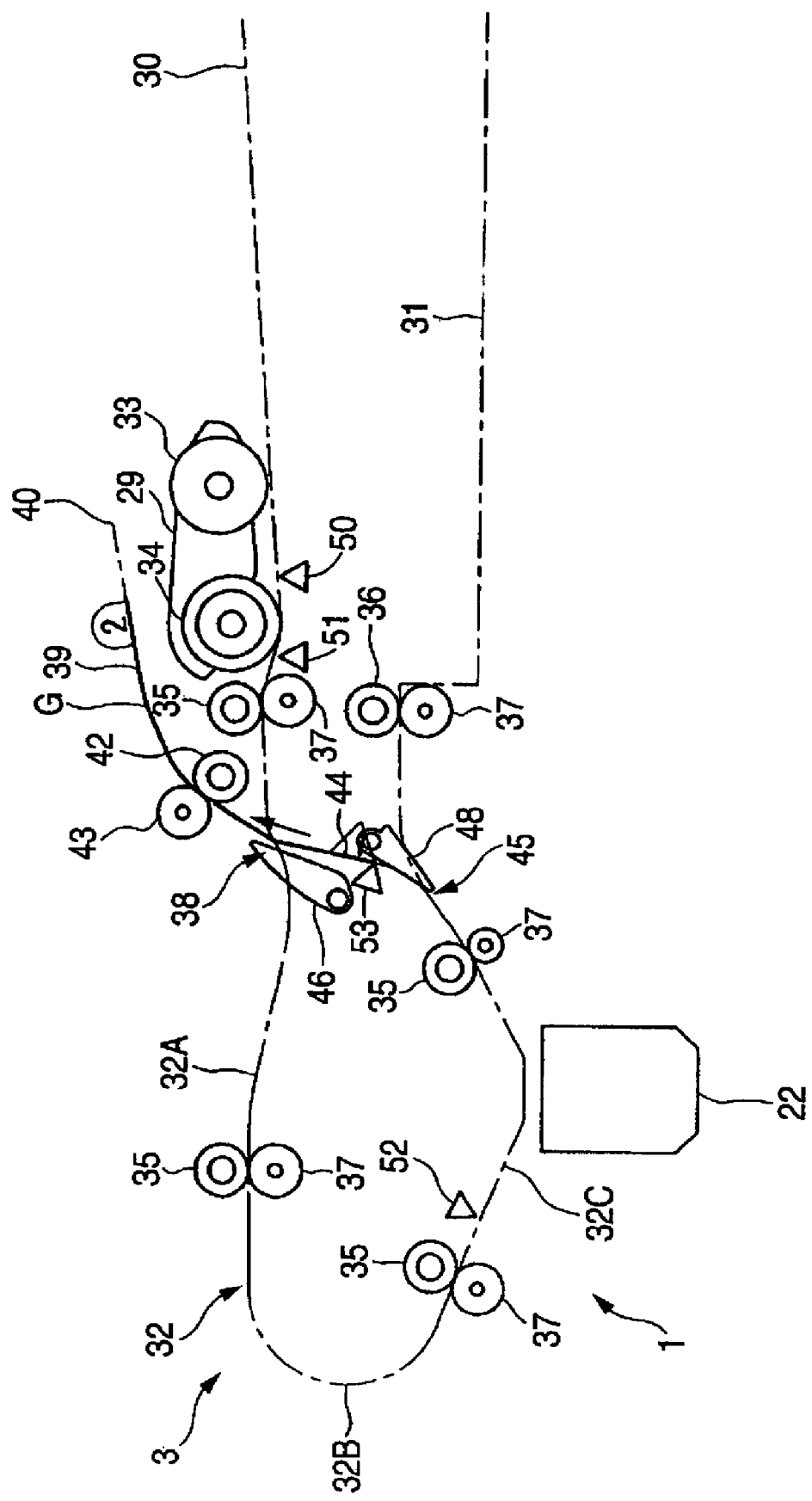
FIG. 22 is a schematic diagram explaining the image reading operation at the time of the double-sided reading.

As shown in FIG. 22, the original G which has entered the bypath 44 abuts against the guide flap 46, pushes the guide flap 46 upward, and enters the switchback path 39 from the bypath 44 at the converging position 38. Namely, at the converging position 38, the guide flap 46 guides the original G so as to allow the straight advance of the original G from the bypath 44 into the switchback path 39. Since the transport route from the bypath 44 to the switchback path 39 is substantially rectilinear, the original G at the branching position straightly advances to enter the switchback path 39 without entering the paper feed tray 30 side of the transport path 32. The original G is then nipped by the switchback roller 42 and the pinch roller 43, and is transported to the final end 40 side along the switchback path 39 by the rotation of the switchback roller 42.

Figure 23:
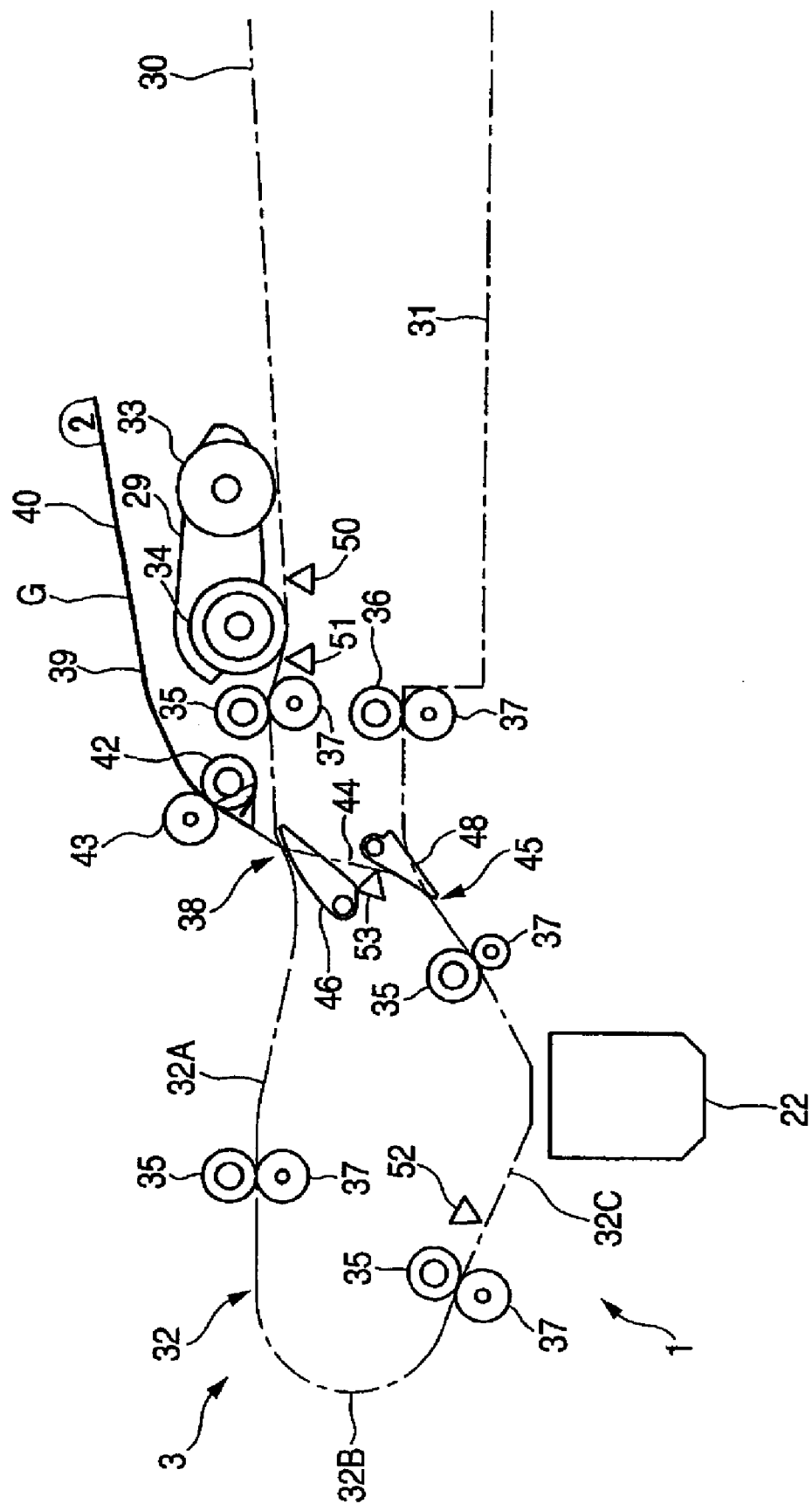
FIG. 23 is a schematic diagram explaining the image reading operation at the time of the double-sided reading.

After the original G has completely entered the switchback path 39, the switchback roller 42 is stopped. More specifically, as shown in FIG. 22, after the tailing end of the original G transported along the bypath 44 is detected by the switchback sensor 53, the trailing end of the original G passes the converging position 38 after the lapse of a predetermined time. Accordingly, on the basis of the detection signal from the switchback sensor 53 and the distance of transport by the transport roller 35 or the counting of the time, it is possible to determine that the original G has completely entered the switchback path 39. As the switchback roller 42 is subsequently stopped, the original G stops in a state of being nipped by the switchback roller and the pinch roller 43, as shown in FIG. 23. At this time, a portion of the original G is exposed from the final end 40 of the switchback path 39 to outside the ADF 3, but the exposed portion of the original G is supported by the original supporting portion 41.

In addition, as the original G passes the converging position 38 and moves away from the guide flap 46, the guide flap 46 rotates to the lower side and assumes the position for allowing the transport route at the converging position 38 to communicate from the switchback path 39 to the upstream side of the reading position of the transport path 32. Subsequently, the switchback roller 42 is rotated in the reverse direction, whereupon the original G is transported along the switchback path 39 so as to return to the transport path 32 side.

Figure 24:
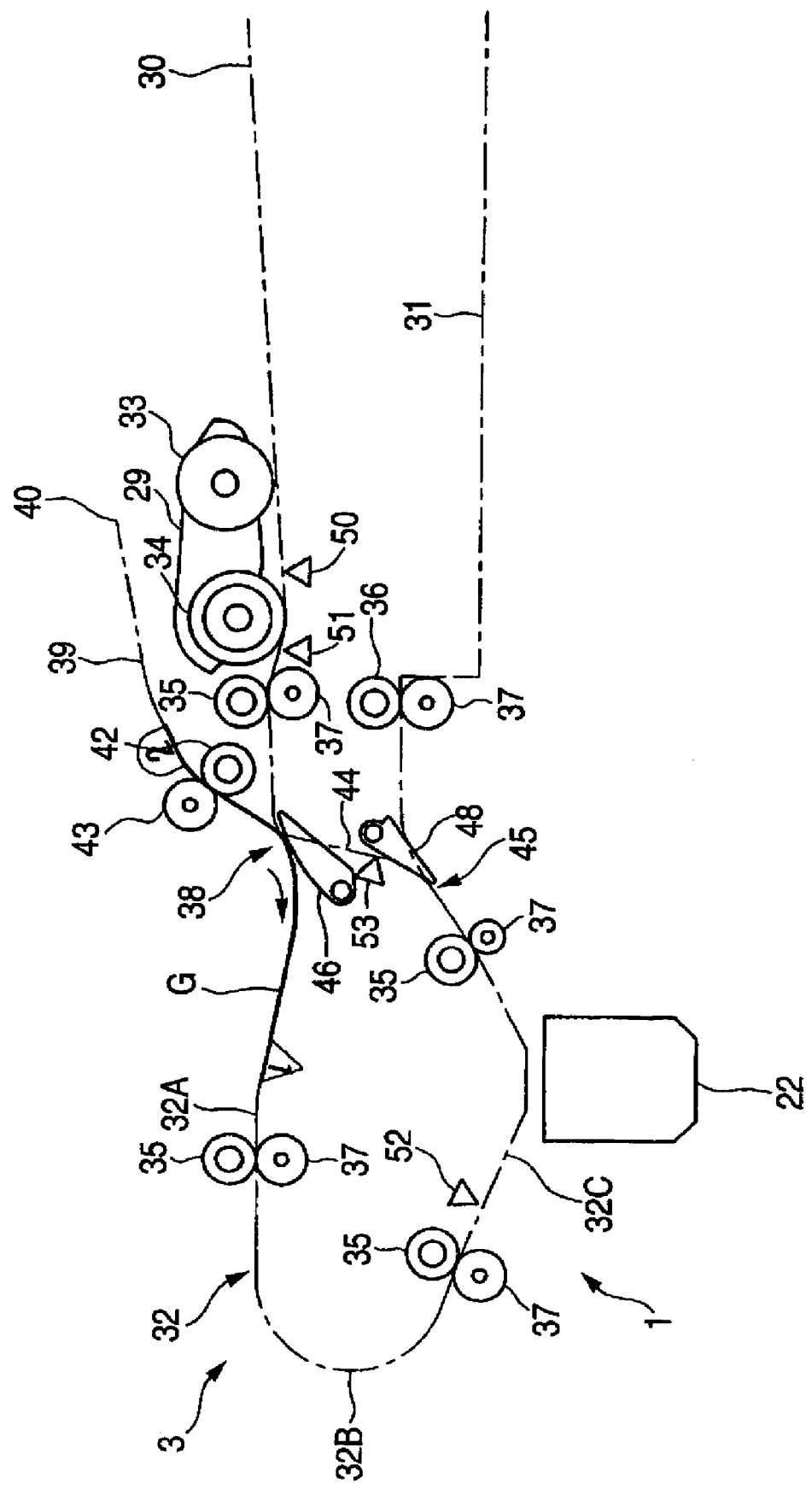
FIG. 24 is a schematic diagram explaining the image reading operation at the time of the double-sided reading.

As shown in FIG. 24, the original G which has been returned from the switchback path 39 tends to advance straightly at the converging position 38, but since the transport route to the bypath 44 is closed by the guide flap 46, the original G enters the upstream side of the reading position of the transport path 32 from the switchback path 39 while being guided by the guide flap 46. The transport route from the switchback path 39 to the paper feed tray 30 side of the transport path 32 is bent at an acuter angle than the transport route from the switchback path 39 to the upstream side of the reading position of the transport path 32, so that the original G returned from the switchback path 39 does not enter the paper feed tray 30 side of the transport path 32 at the converging position 38. Thus, since the original G is returned from the switchback path 39 to the transport path 32, the original G is resent to the transport path 32 in a state in which its leading and trailing ends are reversed from the state in which it was initially transported along the transport path 32. Hence, the original G is transported in a switchback fashion. The original G is then transported along the transport path 32 with its second surface opposing the reading position.

Figure 25:
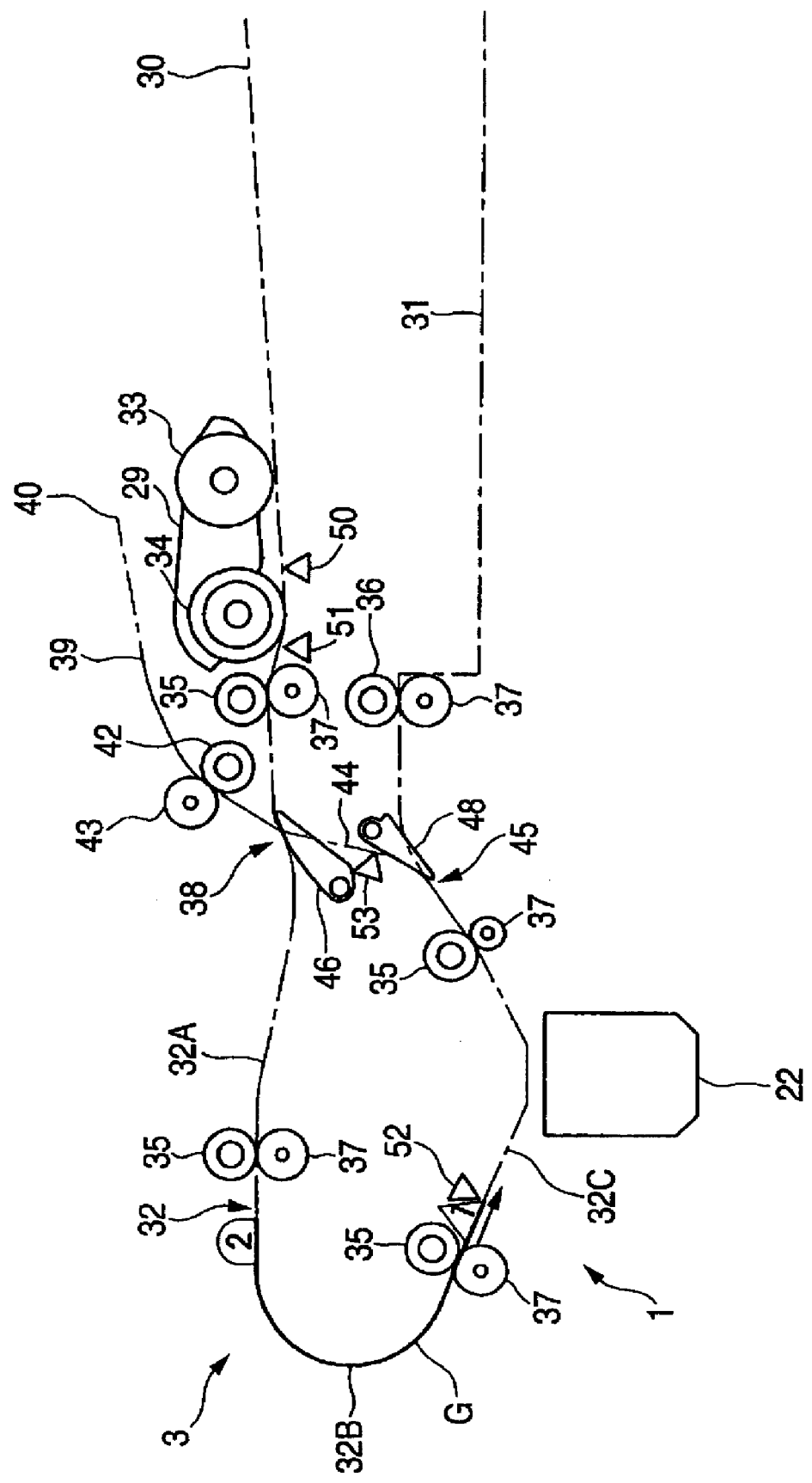
FIG. 25 is a schematic diagram explaining the image reading operation at the time of the double-sided reading.
Figure 26:
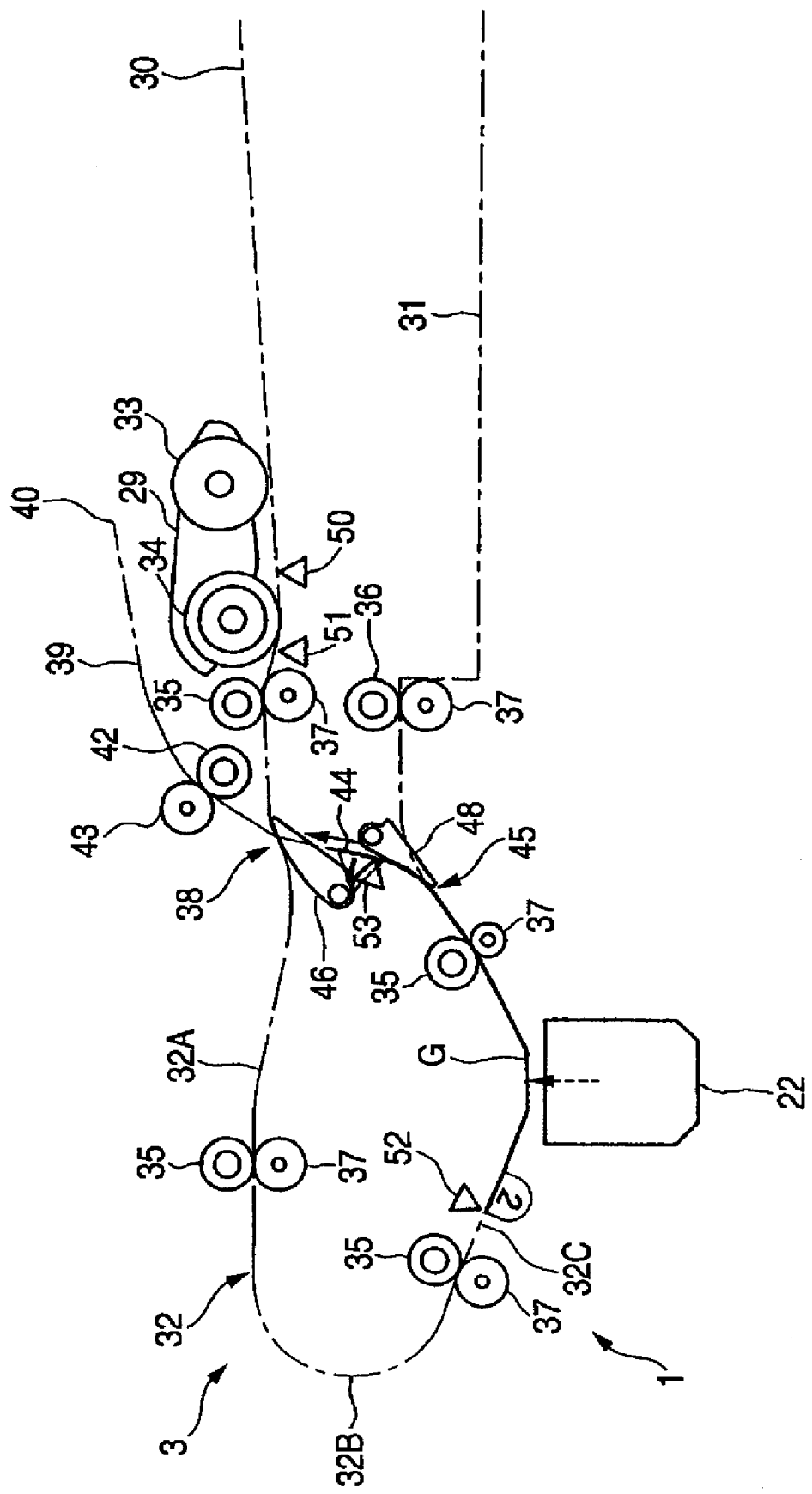
FIG. 26 is a schematic diagram explaining the image reading operation at the time of the double-sided reading.

Then, as shown in FIG. 25, the leading end of the original G is detected by the rear sensor 52, and when the leading end reaches the reading position, as shown in FIG. 36, the image reading of the second surface of the original G is started by the image reading unit 22 (S109). In addition, the original G after its second surface has been read is guided by the guide flap 48 and enters the bypath 44 from the transport path 32 at the branching position 45. It should be noted that when the trailing end of the original G is detected by the rear sensor 52, and that trailing end has reached the reading position, the image reading unit 20 finishes the reading of the second surface of the original (S110).

Figure 27:
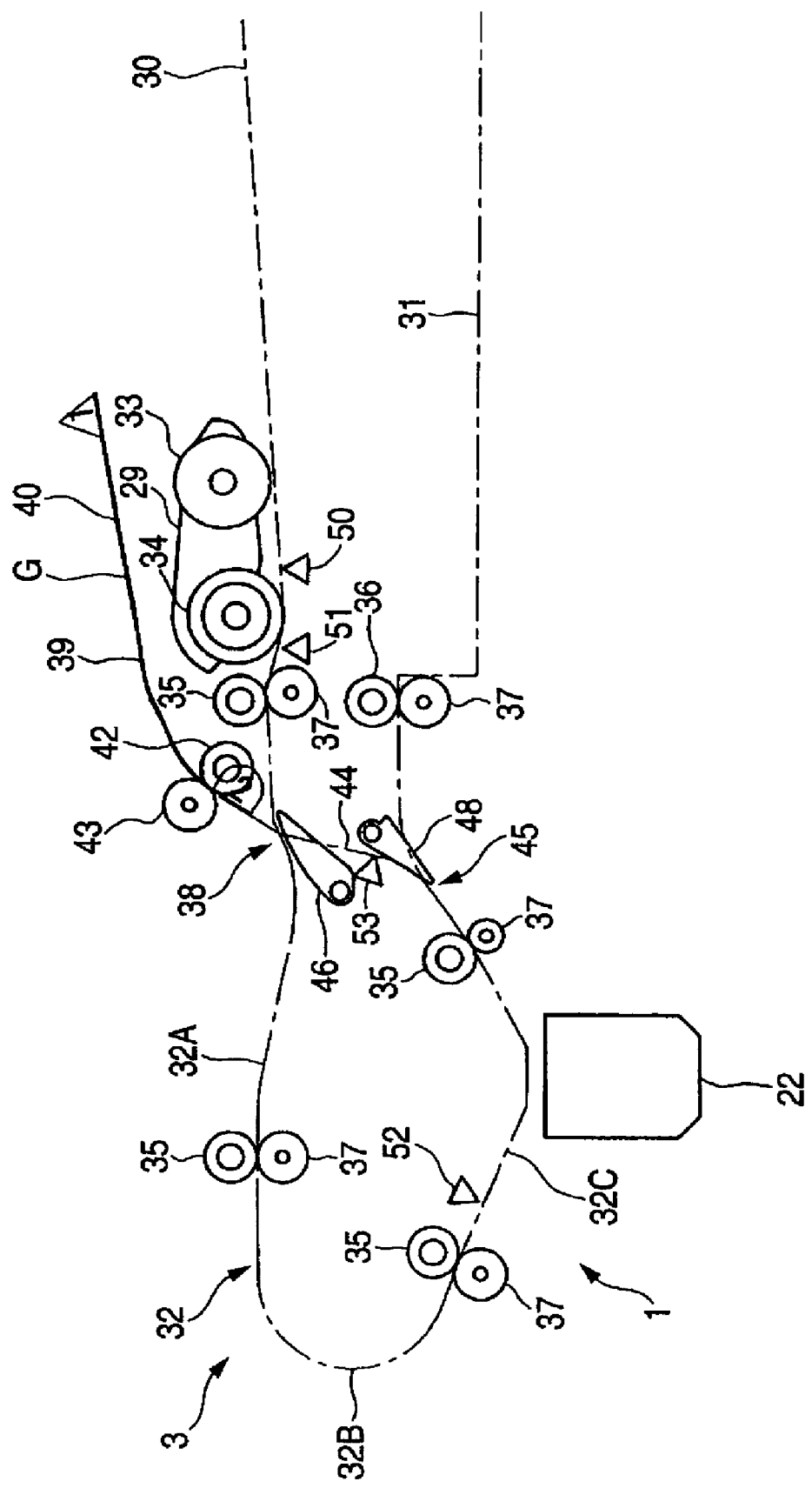
FIG. 27 is a schematic diagram explaining the image reading operation at the time of the double-sided reading.

The original G which entered the bypath 44, pushes up the guide flap 46, and enters the switchback path 39 from the bypath 44 at the converging position 38. After the original G has completely entered the switchback path, as shown in FIG. 27, the switchback roller 42 stops. Further, as the original G passes the guide flap 49, the guide flap 46 returns to the position for allowing the transport route at the converging position 38 to communicate from the switchback path 39 to the reading position side of the transport path 32. Subsequently, the switchback roller 42 is reversely driven, the original G is thereby returned to the transport path 32 side along the switchback roller 39, and the leading and trailing ends are inverted again (S111).

Figure 28:
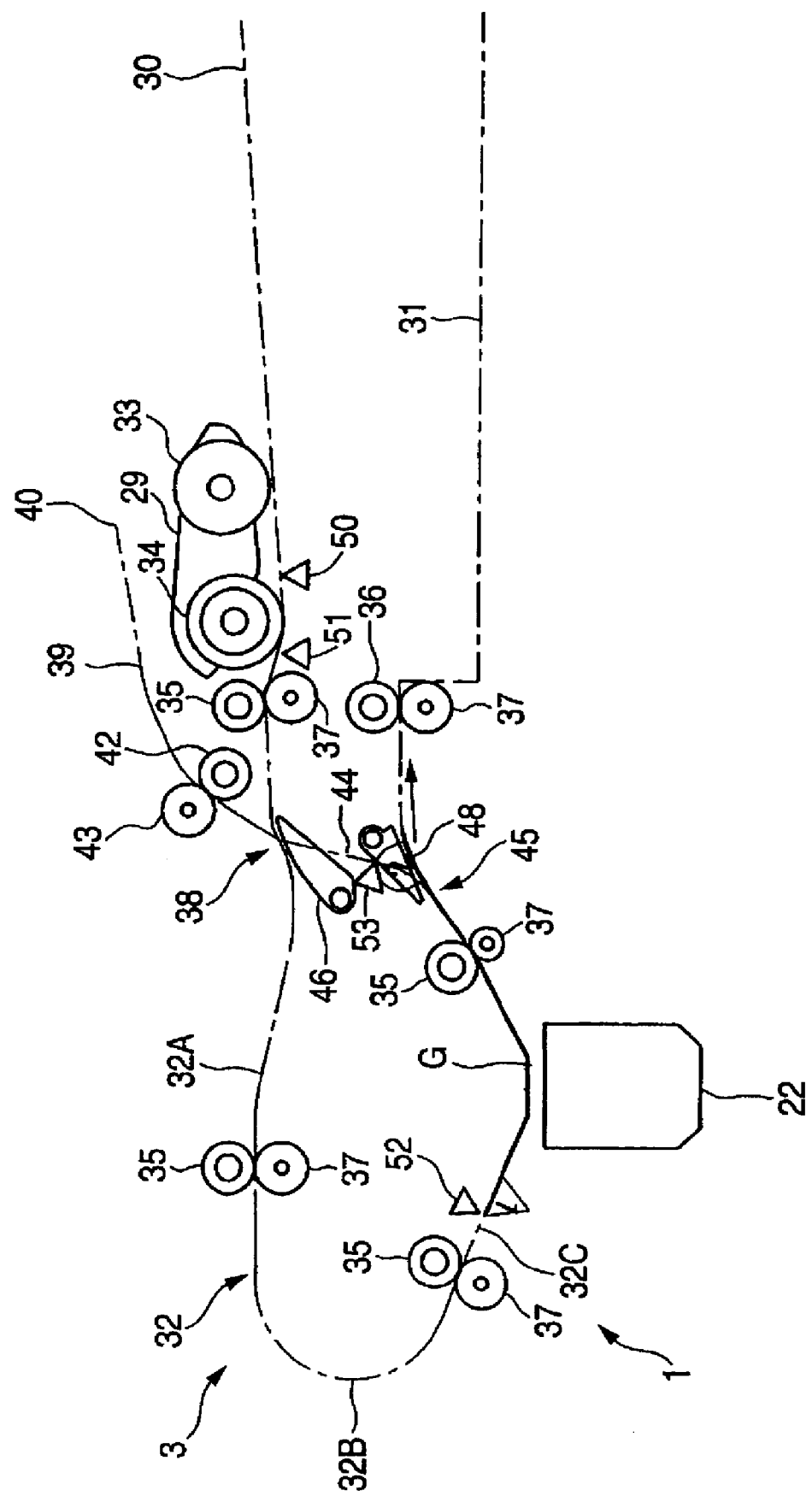
FIG. 28 is a schematic diagram explaining the image reading operation at the time of the double-sided reading.
Figure 29:
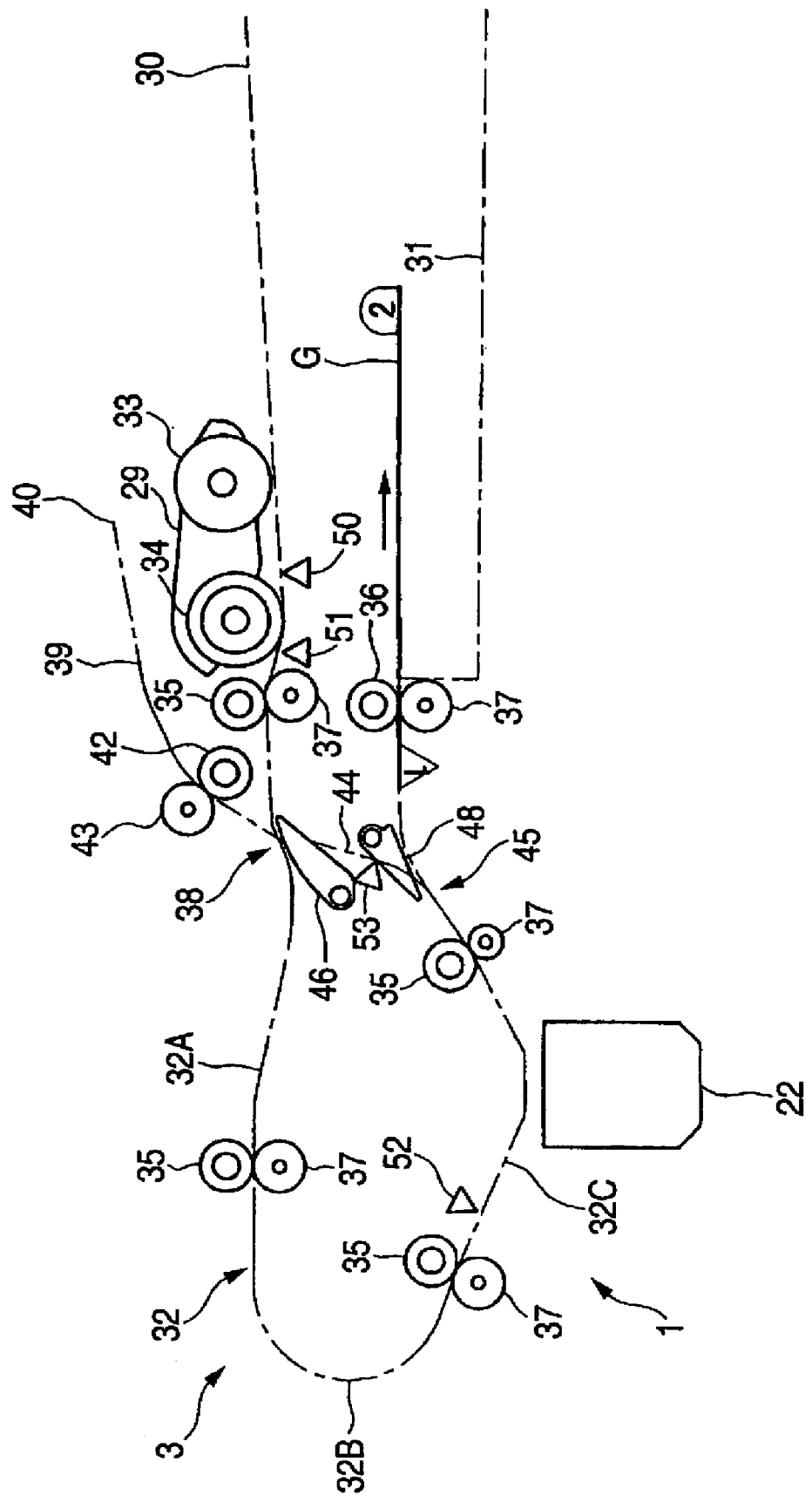
FIG. 29 is a schematic diagram explaining the image reading operation at the time of the double-sided reading.

Then, in the same way as in the case of the single-sided reading. If the original G is larger than the A5 size (NO in S112), and the original G is not a final page original (NO in S113), after the original G has reached the position between the converging position 38 and the branching position 45 of the transport path 32, the guide flap 48 changes over the transport route at the branching position 45 from the reading position side to the paper discharge tray 31 side of the transport path 32 (S114). As a result, as shown in FIG. 28, the original G is guided by the guide flap 48 at the branching position 45. Then, as shown in FIG. 29, the original G is transported to the paper discharge tray 31 side of the transport path 32, and is discharged onto the paper discharge tray 31 with the first surface facing downward. Subsequently, an ensuing original G set on the paper feed tray 30 is fed into the transport path 32, and the above-described series of operation is repeated, whereby the originals G on the paper feed tray 30 are transported one sheet at a time, and double-sided image reading is performed. In addition, since the originals G are sequentially discharged onto the paper discharge tray 31 with the respective first surface facing downward, the state in which the plurality of originals G are stacked on the paper feed tray 30 is maintained.

Meanwhile, if the size of the original G is the A5 size or smaller (YES in S112), or if the original G is a final page original (YES in S113), the guide flap 48 is maintained at the present position. Namely, the guide flap 48 is maintained in the state of having been changed over to the position for allowing the transport route at the branching position 45 to communicate from the reading position side to the bypath 44. As a result, as shown in FIG. 21, the original G which has passed the reading position is guided by the guide flap 48 and enters the bypath 44 from the transport path 32 at the branching position 45. As shown in FIG. 22, the original G which entered the bypath 44 pushes the guide flap 46 upward, and enters the switchback path 39 from the bypath 44.

The original G which entered the switchback path 39 for the third time is nipped by the switchback roller 42 and the pinch roller 43, and is transported to the final end 40 side along the switchback path 39 by the rotation of the switchback roller 42. Then, when the original G has completely entered the switchback path 39, the switchback roller 42 is subjected to drive control so as to transport the original further toward the final end 40 without being subjected to reverse rotation control (S115). As a result, the original G is released from the nip between the switchback roller 42 and the pinch roller 43, and assumes a state in which it is exposed from the final end 40 of the switchback path 39 to outside the ADF 3. In this case, the original G becomes stationary in a state in which it is clamped by the original presser 28 provided at the final end 40. At that juncture, the exposed leading end side of the original G is supported by the original supporting portion 41. Subsequently, in the case where the original G is a final page original, the series of image reading operation is finished. If there is an ensuing original, the above-described operation is repeated. It should be noted that if there is an ensuing original of the A5 size or smaller, the above-described operation is repeated.

In this image reading apparatus 1 having the switchback path 39 for resending to the transport path 32 after the reading of the first surface or the second surface, if the original G is a final page original, that final page original is not discharged onto the paper discharge tray 31, but is exposed from the final end 40 to outside the apparatus through the bypath 44 and the switchback path 39. Therefore, it is possible to allow the user to directly recognize the originals visually and to be strongly impressed visually with the presence of the originals, thereby suitably arousing the user's attention to the prevention of forgetting to take out the originals discharged onto the paper discharge tray 31. In consequence, cases of forgetting to take out the originals are reduced.

In addition, in the case where the original G is the A5 size or smaller, which is a relatively small size, all the fed originals G are discharged to outside the apparatus irrespective of whether or not the original G is a final page original. Therefore, it is possible to overcome the troublesomeness of taking out the originals from the paper discharge tray 31 in the case where the original size is small.

It should be noted that the above-described aspect is merely an example of the invention, and it goes without saying that the aspect can be modified appropriately within the scope which does not change the gist of the invention.

According to the aspects, if the size of the original placed on the original placing portion is detected by the second detecting unit, on the basis of the result of a detection determination processing for determining whether or not the size of the original is smaller than a fixed size. If it is determined by this determination that the original placed on the original placing portion is smaller than the predetermined fixed size, all the fed originals are transported to the switchback transport path and are exposed from the opening portion to outside the device irrespective of whether or not that original is a final page original. In a case where the size of the original is small, in addition to the problem of forgetting to take out the original, there is a problem in that it is troublesome to take out the original since it is difficult to grasp the original by putting one's hand over the original discharging portion. Further, in the case of a plurality of originals, there can be cases where the user fails to completely grasp the originals and inadvertently drops some of them, leaving them behind on the original discharging portion as they are. Accordingly, in accordance with the invention, since all the originals are discharged from the opening portion to outside the device, it is possible to realize the facilitation of the taking out of the originals and the prevention of forgetting to take out the originals.

According to the aspects, as the driving of the driving unit is controlled by the controlling unit, the driving force of the driving unit is transmitted to the guide member, and that guide member is thereby swung. As the guide member is swung, at the branching position either one of the first transport path and the second transport path is closed, and the other one is opened. Thus, the changeover of the transport route of the original can be suitably realized by the guide member and the driving unit.

[FIG. 7]
50: 1ST FRONT SENSOR
51: 2ND FRONT SENSOR
52: REAR SENSOR
53: S/B SENSOR
61: 1ST SIZE SENSOR
62: 2ND SIZE SENSOR
63: 3RD SIZE SENSOR
114: DRIVE CKT
115: DRIVE CKT
116: DRIVE CKT
111: FLAP MOTOR
112: CARRIAGE MOTOR
113: ORIGINAL TRANSPORTING MOTOR
48: GUIDE FLAP
25: CARRIAGE
35: TRANSPORT ROLLER
36: DISCHARGE ROLLER
42: S/B ROLLER
34: SEPARATION ROLLER
33: FEED-IN ROLLER

[FIG. 8]
S1: IS INSTRUCTION TO START SINGLE-SIDED READING INPUTTED?
S2: IS ORIGINAL PRESENT?
S3: ERROR DISPLAY
S4: DRIVE THE ROLLERS
S5: A5 SIZE OR SMALLER?
S6: FINAL PAGE ORIGINAL?
S7: CHANGE OVER THE GUIDE FLAP TO POSITION COMMUNICATING WITH THE PAPER DISCHARGE TRAY
S8: CHANGE OVER THE GUIDE FLAP TO POSITION COMMUNICATING WITH THE BYPATH
S9: START READ PROCESSING OF 1ST SURFACE
S10: FINISH READ PROCESSING OF 1ST SURFACE

[FIG. 18]
S101: IS INSTRUCTION TO START DOUBLE-SIDED READING INPUTTED?
S102: IS ORIGINAL PRESENT?
S103: ERROR DISPLAY
S104: DRIVE THE ROLLERS
S105: CHANGE OVER THE GUIDE FLAP TO POSITION COMMUNICATING WITH THE BYPATH
S106: START READ PROCESSING OF 1ST SURFACE
S107: FINISH READ PROCESSING OF 1ST SURFACE
S108: SWITCHBACK TRANSPORT
S109: START READ PROCESSING OF 2ND SURFACE
S110: FINISH READ PROCESSING OF 2ND SURFACE
S111: SWITCHBACK TRANSPORT
S112: A5 SIZE OR SMALLER?
S113: FINAL PAGE ORIGINAL?
S114: CHANGE OVER THE GUIDE FLAP TO POSITION COMMUNICATING WITH THE PAPER DISCHARGE TRAY
S115: DISCHARGE CONTROL OF THE SWITCHBACK ROLLER

What is claimed is:

1. An original transporting device comprising:
an original placing portion on which an original is placed;
an original discharging portion that is provided on a lower side of the original placing portion and on which the original is discharged;

a first transport path that connects the original placing portion and the original discharging portion via a reading position;
an opening portion provided on an upper side of the original placing portion to expose the original to outside the device;
a switchback transport path formed continuously with the opening portion;
a second transport path that is branched off from a downstream side of the reading position of the first transport path and is connected to the switchback transport path;
a transporting unit provided at least on the first transport path and the switchback transport path to transport the original;
a changeover unit that is disposed at a branching position between the first transport path and the second transport path, the changeover unit is capable of changing a transport route along which the original is transported to a route by way of the first transport path and is capable of changing the transport route to a route by way of the second transport path;
a first detecting unit that detects the presence or absence of the original placed on the original placing portion;
a first determining unit that determines whether or not the original, which is fed from the original placing portion into the first transport path, is a final page original based on a result of detection by the first detecting unit; and
a controlling unit that controls the transporting unit and the changeover unit so as to discharge at least a portion of the final page original whose image has been read at the reading position to outside the device from the opening portion of the switchback transport path through the second transport path on condition that the original, which is fed to the first transport path, is determined by the first determining unit to be the final page original.

2. The original transporting device according to claim 1, further comprising:
a second detecting unit that detects a size of the original placed on the original placing portion; and
a second determining unit that determines whether or not the size of the original placed on the original placing portion is smaller than a fixed size based on a result of detection by the second detecting unit, wherein
the controlling unit controls the transporting unit and the changeover unit so as to discharge the final page original whose image has been read at the reading position to outside the device from the opening portion of the switchback transport path through the second transport path on condition that the size of the original is determined by the second determining unit to be smaller than the fixed size and irrespective of whether or not the original is the final page original.

3. The original transporting device according to claim 1, wherein
the changeover unit includes a guide member and a driving unit that drives the guide member;
the guide member is swingably provided on a device body, and the guide member is capable of guiding the original to the first transport path and is capable of guiding the original to the second transport path at the branching position.

4. The original transporting device according to claim 1, wherein
the first transport path is formed in a transverse, substantially U-shape in a vertical cross-sectional view and transports the original from the original placing portion to the original discharging portion in a U-turn fashion, and
the second transport path is branched off from a first branching position in a lower rectilinear portion of the U-shape of the first transport path, intersects a second branching position in an upper rectilinear portion of the U-shape of the first transport path and is connected to an entrance port of the switchback transport path at the second branching position.

5. The original transporting device according to claim 1, further comprising
an original supporting portion that supports the original discharged from the opening portion to outside the device, wherein
the original supporting portion is provided at an exit side of the opening portion.

6. The original transporting device according to claim 1, further comprising
an original holding member that nips the original discharged from the opening portion to outside the device, wherein
the original supporting portion is provided at an exit side of the opening portion.

7. An image reading apparatus comprising:
an original placing portion on which an original is placed;
an original discharging portion that is provided on a lower side of the original placing portion and on which the original is discharged;
a first transport path that connects the original placing portion and the original discharging portion via a reading position;
an opening portion provided on an upper side of the original placing portion to expose the original to outside the device;
a switchback transport path formed continuously with the opening portion;
a second transport path that is branched off from a downstream side of the reading position of the first transport path and is connected to the switchback transport path;
a transporting unit provided at least on the first transport path and the switchback transport path to transport the original;
a changeover unit that is disposed at a branching position between the first transport path and the second transport path, the changeover unit is capable of changing a transport route along which the original is transported to a route by way of the first transport path and is capable of changing the transport route to a route by way of the second transport path;
a first detecting unit that detects the presence or absence of the original placed on the original placing portion;
a first determining unit that determines whether or not the original, which is fed from the original placing portion into the first transport path, is a final page original based on a result of detection by the first detecting unit;
a controlling unit that controls the transporting unit and the changeover unit so as to discharge at least a portion of the final page original whose image has been read at the reading position to outside the device from the opening portion of the switchback transport path through the second transport path on condition that the original, which is fed to the first transport path, is determined by the first determining unit to be the final page original; and
an image reading unit that reads an image on the original, which passes the reading position.

* * * * *